United States Patent
Lee et al.

(10) Patent No.: US 10,737,621 B2
(45) Date of Patent: Aug. 11, 2020

(54) CLOAKING DEVICES WITH LENSES AND PLANE MIRRORS AND VEHICLES COMPRISING THE SAME

(71) Applicant: Toyota Motor Engineering & Manufacturing North America, Inc., Erlanger, KY (US)

(72) Inventors: Kyu-Tae Lee, Ann Arbor, MI (US); Debasish Banerjee, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 527 days.

(21) Appl. No.: 15/704,803

(22) Filed: Sep. 14, 2017

(65) Prior Publication Data
US 2019/0077314 A1     Mar. 14, 2019

(51) Int. Cl.
| | | |
|---|---|---|
| *G02B 17/00* | (2006.01) | |
| *B60R 1/00* | (2006.01) | |
| *B62D 25/04* | (2006.01) | |
| *G02B 17/08* | (2006.01) | |

(52) U.S. Cl.
CPC .............. *B60R 1/007* (2013.01); *B62D 25/04* (2013.01); *G02B 17/08* (2013.01)

(58) Field of Classification Search
CPC .. G02B 17/08; G02B 17/0856; G02B 17/086; G02B 17/0836; B60R 1/007; B62D 25/04
See application file for complete search history.

(56) References Cited

U.S. PATENT DOCUMENTS

| | | | |
|---|---|---|---|
| 9,057,964 B2 | 6/2015 | Mann et al. | |
| 9,557,547 B2 | 1/2017 | Choi et al. | |
| 10,300,956 B2 * | 5/2019 | He | G02B 5/045 |
| 2012/0268836 A1 | 10/2012 | Mercado | |
| 2015/0183375 A1 | 7/2015 | Wu | |
| 2017/0113617 A1 | 4/2017 | Obata et al. | |

FOREIGN PATENT DOCUMENTS

JP         2010139997 A      6/2010

OTHER PUBLICATIONS

U.S. Appl. No. 15/435,996, filed Feb. 17, 2017; Inventors: Debasish Banerjee, Chengang Ji, Mayu Takagi.

* cited by examiner

*Primary Examiner* — Alicia M Harrington
(74) *Attorney, Agent, or Firm* — Dinsmore & Shohl LLP

(57) ABSTRACT

A cloaking device includes an object-side, an image-side, an object-side cloaking region (CR) reflection boundary having an outward facing mirror surface, and an image-side CR reflection boundary having an outward facing mirror surface. A cloaking region is bounded by the object-side CR reflection boundary and the image-side CR reflection boundary. An object-side lens, an image-side lens and at least one exterior reflection boundary are included. Light from an object positioned on the object-side of the cloaking device and obscured by the cloaking region is focused by the object-side lens, reflected by the object-side CR reflection boundary, the at least one exterior reflection boundary and the image-side CR reflection boundary, and focused by the image-side lens to form an image of the object on the image-side of the cloaking device such that the light from the object appears to pass through the cloaking region.

20 Claims, 9 Drawing Sheets

CLOAKING DEVICES WITH LENSES AND PLANE MIRRORS AND VEHICLES COMPRISING THE SAME

TECHNICAL FIELD

The present specification generally relates to apparatuses and methods for making an object appear transparent and, more specifically, to cloaking devices for pillars of vehicles and methods for making pillars of vehicles appear transparent.

BACKGROUND

Studies on cloaking devices that appear to make a pillar of a vehicle transparent have been published. Such studies disclose the use of metamaterials or the use of video cameras in combination with a display screen to allow an occupant of a vehicle to ostensibly "see" through the vehicle pillar, thereby reducing blind spots in the vehicle. However, metamaterials and video technology use complicated material designs and equipment.

Accordingly, a need exists for alternative devices that appear to make a pillar of a vehicle transparent.

SUMMARY

In one embodiment, a cloaking device includes an object-side, an image-side and an apex axis extending from the object-side to the image-side. An object-side cloaking region (CR) reflection boundary having an outward facing mirror surface and an inward facing surface, and an image-side CR reflection boundary having an outward facing mirror surface and an inward facing-surface, are included. A cloaking region is bounded by inward facing surfaces of the object-side CR reflection boundary and the image-side CR reflection boundary. An object-side lens, an image-side lens and at least one exterior reflection boundary are included. The object-side lens and the image-side lens each include an inward facing surface and an outward facing convex surface, and the least one exterior reflection boundary includes an inward facing mirror surface spaced apart from the object-side CR reflection boundary and the image-side CR reflection boundary. In some embodiments, the at least one exterior reflection boundary is a centrally positioned exterior reflection boundary with the inward facing mirror surface facing the object-side CR reflection boundary and the image-side CR reflection boundary. In other embodiments, the at least one exterior reflection boundary includes an object-side exterior reflection boundary with an inward facing mirror surface, a centrally positioned reflection boundary with an outward facing mirror surface, and an image-side exterior reflection boundary with an inward facing mirror surface. Light from an object positioned on the object-side of the cloaking device and obscured by the cloaking region is focused by the object-side lens, reflected by the object-side CR reflection boundary, the at least one exterior reflection boundary and the image-side CR reflection boundary, and focused by the image-side lens to form an image of the object on the image-side of the cloaking device such that the light from the object appears to pass through the cloaking region.

In another embodiment, a cloaking device assembly includes an object-side, an image-side, an apex axis extending from the object side to the image side, a pair of object-side cloaking region (CR) reflection boundaries and a pair of image-side CR reflection boundaries. The pair of object-side CR reflection boundaries includes a first object-side CR reflection boundary positioned on a first side of the apex axis and a second object-side CR reflection boundary positioned on a second side of the apex axis. The pair of image-side CR reflection boundaries includes a first image-side CR reflection boundary positioned on the first side of the apex axis and a second image-side CR reflection boundary positioned on the second side of the apex axis opposite the first side. Each of the pair of object-side CR reflection boundaries and each of the pair of image-side CR reflection boundaries include an outward facing mirror surface and an inward facing surface. A cloaking region is bounded by the inward facing surfaces of the pair of object-side CR reflection boundaries and the pair of image-side CR reflection boundaries. A pair of object-side lenses and a pair of image-side lenses are included. The pair of object-side lenses include a first object-side lens positioned on the first side of the apex axis and a second object-side lens positioned on the second side of the apex axis. Also, the pair of image-side lenses include a first image-side lens positioned on the first side of the apex axis and a second image-side lens positioned on the second side of the apex axis. Each of the pair of object-side lenses and each of the pair of image-side lenses include an inward facing surface and an outward facing convex surface. At least one pair of exterior reflection boundaries with a first exterior reflection boundary positioned on the first side of the apex axis and a second exterior reflection boundary positioned on the second side of the apex axis is included. In some embodiments, the at least one pair of exterior reflection boundaries is a pair of centrally positioned exterior reflection boundaries with an inward facing mirror surface. In other embodiments, the at least one pair of exterior reflection boundaries includes a pair of object-side exterior reflection boundaries with an inward facing mirror surface, a pair of centrally positioned reflection boundaries with an outward facing mirror surface, and a pair of image-side exterior reflection boundaries with an inward facing mirror surface. Light from an object positioned on the object-side of the cloaking device assembly and obscured by the cloaking region is focused by the pair of object-side lenses, reflected by the pair of object-side CR reflection boundaries, the at least one pair of exterior reflection boundaries and the pair of image-side CR reflection boundaries, and focused by the pair of image-side lenses to form an image of the object on the image-side of the cloaking device such that the light from the object appears to pass through the cloaking region.

In still another embodiment, a vehicle includes an A-pillar and a cloaking assembly with an object-side and an image-side. The cloaking assembly includes an object-side cloaking region (CR) reflection boundary with an outward facing mirror surface and an inward facing surface, and an image-side CR reflection boundary with an outward facing mirror surface and an inward facing surface. A cloaking region is bounded by the inward facing surfaces of the object-side CR reflection boundary and the image-side CR reflection boundary and the A-pillar is positioned within the cloaking region. An object-side achromatic lens, an image-side achromatic lens, and at least one exterior reflection boundary are included. In some embodiments, the at least one exterior reflection boundary includes a centrally positioned exterior reflection boundary with an inward facing mirror surface. In other embodiments, the at least one exterior reflection boundary includes an object-side exterior reflection boundary with an inward facing mirror surface, a centrally positioned reflection boundary with an outward facing mirror surface, and an image-side exterior reflection boundary with an inward facing mirror surface. Light from an object positioned on the object-side of the cloaking device and obscured by the cloaking region is focused by the object-side achromatic lens, reflected by the object-side CR reflection boundary, the at least one exterior reflection boundary and the image-side CR reflection boundary, and focused by the image-side achromatic lens to form an image of the object on the image-side of the cloaking device such that the light from the object appears to pass through the A-pillar.

These and additional features provided by the embodiments described herein will be more fully understood in view of the following detailed description in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

According to one or more embodiments described herein, a cloaking device may generally comprise a plurality of lenses and a plurality of planar mirrors which direct incoming light around a cloaking region. The cloaking devices described herein may utilize achromatic lenses, cylindrical lenses and planar mirrors to focus, reflect, and re-focus light from an object. Cloaking devices described herein may be used to cloak vehicle articles such as vehicle A-pillars, B-pillars, C-pillars, D-pillars, etc., and remove a "blind spot" caused by the vehicle article. A blind spot refers to a region of the vehicle where an occupant's view may be obstructed. The utilization of the lenses and planar mirrors allows a driver to perceive an image which, if not for the cloaking device, would be obstructed by a pillar of the vehicle. Various embodiments of cloaking devices and methods for using the same will be described in further detail herein with specific reference to the appended drawings.

Figure 1:
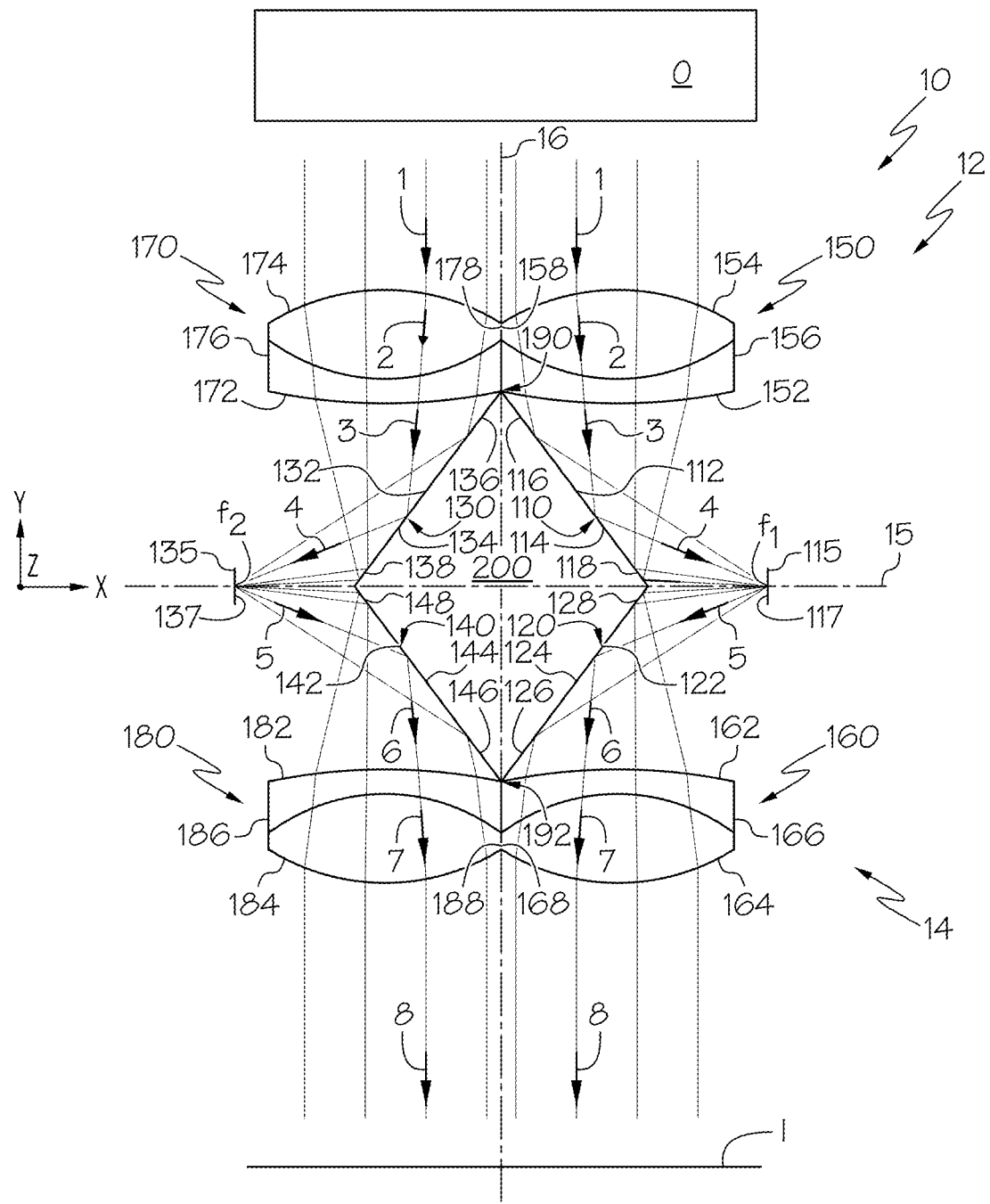
FIG. 1 schematically depicts a top view of a cloaking device according to one or more embodiments disclosed and described herein.

FIG. 1 generally depicts one embodiment of a cloaking device. The cloaking device includes a cloaking region (CR) that is at least partially bounded by at least two CR reflection boundaries, at least two lenses, and at least one exterior reflection boundary spaced apart from the at least two CR reflection boundaries. As used herein, the terms "boundaries" and "boundary" refer to a physical surface, and the terms "reflection boundary" and "reflection boundaries" refer to a "planar reflection boundary" and "planar reflection boundaries", respectively, unless otherwise stated. The term "exterior" refers to a boundary or mirror surface spaced apart from, i.e., positioned a predetermined distance from, one of the CR reflection boundaries. One of the CR reflection boundaries may be an object-side CR reflection boundary and another of the CR reflection boundaries may be an image-side CR reflection boundary. Also, one of the lenses may be an object-side lens and another of the lenses may be an image-side lens. The at least one exterior reflection boundary comprises an inward facing mirror surface spaced apart from the object-side CR refection boundary and the image-side CR reflection boundary.

The object-side lens is oriented to focus incident light from an object positioned on an object side of the cloaking device onto the object-side CR reflection boundary. The object-side CR reflection boundary is oriented to reflect light from the object-side lens onto the inward facing mirror surface of the at least one exterior reflection boundary, and the at least one exterior reflection boundary is oriented to reflect light from the object-side CR reflection boundary onto the image-side CR reflection boundary. The image-side CR reflection boundary is oriented to reflect light from the at least one exterior reflection boundary onto the image-side lens, and the image-side lens is oriented to focus light from the image-side CR reflection boundary and form the image of the object on the image-side of the cloaking device.

Still referring to FIG. 1, embodiments of a cloaking device include a cloaking assembly 10 with an object-side 12, an image-side 14 and four CR reflection boundaries 110, 120, 130, 140. The object side 12 is positioned above (+Y direction) a bisecting axis 15 and the image-side 14 is positioned below (−Y direction) the bisecting axis 15. That is, the bisecting axis 15 extends between and delineates the object-side 12 and the image-side 14. Each of the four CR reflection boundaries 110, 120, 130, 140 has a length along the X-axis, a width along the Y-axis and a height along the Z-axis shown in the figures. That is, the X-axis shown in the figures extends along a length of the four CR reflection boundaries 110, 120, 130, 140, the Y-axis shown in the figures extends along a width of the four CR reflection boundaries 110, 120, 130, 140, and the Z-axis shown in the figures extends along a height of the four CR reflection boundaries 110, 120, 130, 140. The two CR reflection boundaries 110, 130 may be positioned on the object-side 12 of the cloaking assembly 10 to face an object 'O' and may be referred to herein as object-side CR reflection boundaries 110, 130. The two CR reflection boundaries 120, 140 may be positioned on the image-side 14 of the cloaking assembly 10 to provide an image 'I' formed by the cloaking assembly 10 and may be referred to herein as image-side CR reflection boundaries 120, 140.

The CR reflection boundaries 110, 120, 130, 140 each have an outward facing mirror surface 112, 122, 132, 142 and an inward facing surface 114, 124, 134, 144, respectively. The term "outward" used herein refers to a surface that faces away and/or reflects light away from a cloaking region 200 bounded at least partially by the CR reflection boundaries 110, 120, 130, 140, and the term "inward" used herein refers to a surface that faces towards and/or reflects light towards the cloaking region 200. In embodiments, one or more of the inward facing surfaces 114, 124, 134, 144 may be an opaque surface. The outward facing mirror surfaces 112, 122, 132, 142 can be made from omnidirectional photonic crystals or mirrors such that light incident on the outward facing mirror surfaces 112, 122, 132, 142 is reflected there from. As used herein, the term "mirror surface" refers to a surface that reflects all modes of light (e.g. s-polarized light and p-polarized light) incident on the mirror surface. Also, as used herein the term "reflected there from" refers to at least 50% of incident light being reflected from a surface. In some embodiments, at least 60% of incident light is reflected from the surface, while in other embodiments at least 70% of incident light is reflected from the surface. In still other embodiments, at least 80% of incident light, for example at least 90% of incident light is reflected from the surface.

The CR reflection boundaries 110, 120, 130, 140 may have an apex end 116, 126, 136, 146 and a side end 118, 128, 138, 148, respectively. The side ends 118, 128, 138, 148 are spaced apart from the apex ends 116, 126, 136, 146, respectively, and the CR reflection boundaries 110, 120, 130, 140 extend between apex ends 116, 126, 136, 146 and side ends 118, 128, 138, 148, respectively. In embodiments, the apex ends 116, 136 of the two object-side CR reflection boundaries 110, 130, respectively, meet or intersect at an apex 190, and in the alternative or in addition to, the apex ends 126, 146 of the two image-side CR reflection boundaries 120, 140, respectively, meet or intersect at an apex 192. In such embodiments, an apex axis 16 bisects the apex 190 and the apex 192, and may be a centerline between a right hand side (+X direction) and a left hand side (−X direction) of the cloaking assembly 10. In other embodiments, the apex ends 116, 136 of the two object-side CR reflection boundaries 110, 130, respectively, are spaced apart from each other and/or the apex ends 126, 146 of the two image-side CR reflection boundaries 120, 140, respectively, are spaced apart from each other such that a uncloaked region or gap (not shown) is present between the spaced apart apex ends 116, 136 and/or spaced apart apex ends 126, 146. In such embodiments, an image of the portion of the object O positioned above (+Y direction) the uncloaked region is not provided on the image side 14 of the cloaking assembly 10.

In embodiments, the side end 118 may be positioned adjacent to and may be joined to side end 128 and the side end 138 may be positioned adjacent to and may be joined to side end 148 as depicted in FIG. 1. In other embodiments, the side ends 118, 138 may be spaced apart (Y direction) from the side ends 128, 148 (not shown).

In embodiments, the two object-side CR reflection boundaries 110, 130 and the two image-side CR reflection boundaries 120, 140 form the cloaking region 200 that is bound at least partly by the inward facing surfaces 114, 134, 124, 144. The two object-side CR reflection boundaries 110, 130 and the two image-side CR reflection boundaries 120, 140 have a height 'h' (FIG. 8) in the Z-direction of the coordinate axes in the figures and light reflected or transmitted within the cloaking region 200 does not pass through the inward facing surfaces 114, 134, 124, 144. Accordingly, an article located within the cloaking region 200 (e.g., a cloaked article) is not visible to an observer viewing the cloaking assembly 10 from the image-side 14 in the +Y direction.

Still referring to FIG. 1, the cloaking assembly may include four lenses 150, 160, 170, 180. Each of the four lenses 150, 160, 170, 180 has a length along the X-axis, a thickness along the Y-axis and a height along the Z-axis of the coordinate axes shown in the figures. That is, the X-axis shown in the figures extends along a length of the four lenses 150, 160, 170, 180, the Y-axis shown in the figures extends along a thickness of the four lenses 150, 160, 170, 180, and the Z-axis shown in the figures extends along a height of the four lenses 150, 160, 170, 180. The two lenses 150, 170 may be positioned on the object-side 12 of the cloaking assembly 10 to face an object 'O' and may be referred to herein as object-side lenses 150, 170. The two lenses 160, 180 may be positioned on the image-side 14 of the cloaking assembly 10 to provide an image 'I' formed by the cloaking assembly 10 and may be referred to herein as image-side lenses 160, 180.

The lenses 150, 160, 170, 180 each have an inward facing surface 152, 162, 172, 182 and an outward facing convex surface 154, 164, 174, 184, respectively. In embodiments, the inward facing surfaces 152, 162, 172, 182 are planar surfaces. In other embodiments, the inward facing surfaces 152, 162, 172, 182 are not planar surfaces, i.e., the inward facing surfaces 152, 162, 172, 182 are curved surfaces. The lenses 150, 160, 170, 180 each have a first end 156, 166, 176, 186, respectively, distal to the apex axis 16 and a second end 158, 168, 178, 188, respectively, proximal to the apex axis 16. The inward facing surfaces 152, 162, 172, 182 and outward facing convex surfaces 154, 164, 174, 184 extend between the first ends 156, 166, 176 186 and the second ends 158, 168, 178, 188, respectively.

Figure 2:
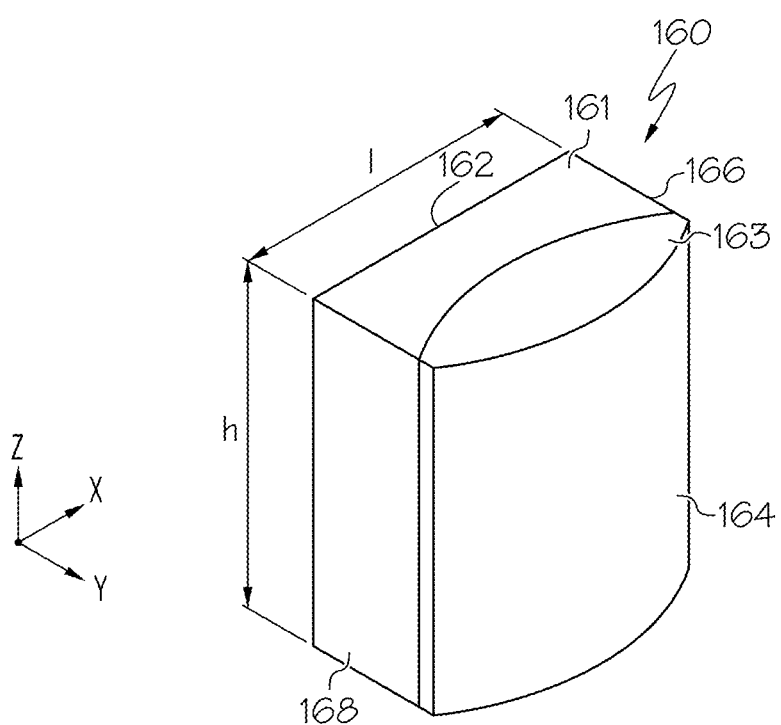
FIG. 2 schematically depicts an achromatic cylindrical lens for a cloaking device according to one or more embodiments disclosed and described herein.

In embodiments, the lenses 150, 160, 170, 180 may be achromatic lenses as depicted in FIG. 1. An isolated perspective view of the lens 160 in the form of an achromatic lens is depicted in FIG. 2. Particularly, the lens 160 includes the inward facing surface 162 and the outward facing convex surface 164. The outward facing convex surface 164 has a radius 'r1'. The inward facing surface 162 and the outward facing convex surface 164 extend between the first end 166 and the second end 168. The lens 160 has a length 'l' along the X-direction, a thickness (not labeled) in the Y-direction, and a height 'h' extending in the Z-direction. The lens 160 may be formed from two optical components, e.g., a flint 161 and a crown 163 as depicted in FIG. 2. The flint 161 comprises the inward facing surface 162 and the crown 163 comprises the outward facing convex surface 164. The flint 161 is formed from a first transparent material with a first index of refraction and the crown 163 is formed from a second transparent material with a second index of refraction that is different than the first index of refraction.

The cloaking assembly 10 may include centrally positioned exterior reflection boundaries 115, 135 spaced apart from the CR reflection boundaries 110, 120 and CR reflection boundaries 130, 140, respectively. In embodiments, the centrally positioned exterior reflection boundaries 115, 135 may be spaced apart from and positioned proximate to the side ends 118, 128 and 138, 148, respectively, of the CR reflection boundaries 110, 120 and 130, 140, respectively. The centrally positioned exterior reflection boundary 115 has an inward facing mirror surface 117 facing the CR reflection boundaries 110, 120 and the centrally positioned exterior reflection boundary 135 has an inward facing mirror surface 137 facing the CR reflection boundaries 130, 140. In such embodiments, the centrally positioned exterior reflection boundary 115 is positioned to the side (+X direction) of the CR reflection boundaries 110, 120 and the centrally positioned exterior reflection boundary 135 is positioned to the side (−X direction) of the CR reflection boundaries 130, 140. In embodiments, the centrally positioned exterior reflection boundaries 115, 135 may be positioned on the bisecting axis 15. Also, the inward facing mirror surfaces 117, 137 may be oriented or aligned generally parallel to the apex axis 16 that bisects the apex 190 and the apex 192.

The object-side lens 150 is positioned relative to the object-side CR reflection boundary 110 such that light from the object O (shown as arrow '1' in FIG. 1) incident on the cloaking assembly 10 on the right hand side (+X direction) propagates through and is focused by the object-side lens 150 (shown as arrow '2' in FIG. 1) onto the outward facing mirror surface 112 (shown as arrow '3' in FIG. 1). The centrally positioned exterior reflection boundary 115 is positioned relative to the object-side CR reflection boundary 110 such that light 3 from the object-side lens 150 is reflected by the outward facing mirror surface 112 onto the inward facing mirror surface 117 (shown as arrow '4' in FIG. 1). In embodiments, light 4 is focused to a focal line $f_1$ and the inward facing mirror surface 117 is positioned at the focal line $f_1$. That is, light 1 incident on the object-side lens 150 along the height h (Z-direction) of the outward facing convex surface 154 may be generally focused by the object-side lens 150, and reflected by the outward facing mirror surface 112, to the focal line $f_1$ extending in the Z-direction. It should be understood that the focal line $f_1$, and other focal lines described herein, are provided by the curvature of a given lens surface or lens surfaces. For example, the focal line $f_1$ is due to or provided by the curvature of the outward facing convex surface 154 of the object-side lens 150.

The centrally positioned exterior reflection boundary 115 may be positioned relative to CR reflection boundaries 110, 120 such that light 4 from the outward facing mirror surface 112 is reflected by and diverges from the inward facing mirror surface 117 onto the outward facing mirror surface 122 of the image-side CR reflection boundary 120 (shown as arrow '5' in FIG. 1). The image-side CR reflection boundary 120 is positioned relative to the centrally positioned exterior reflection boundary 115 such that light 5 from the inward facing mirror surface 117 is reflected by the outward facing mirror surface 122 onto the inward facing surface 162 of the image-side lens 160 (shown as arrow '6' in FIG. 1). The image-side lens 160 is positioned relative to the image-side CR reflection boundary 120 such that light 6 from the outward facing mirror surface 122 propagates through and is focused by the image-side lens 160 (shown as arrow '7' in FIG. 1) in a direction generally parallel to the apex axis 16 (light 8) and forms a portion of the Image I on the right hand side (+X direction) of the apex axis 16. In embodiments, the image-side lens 160 focuses the light 7 back to its original path, i.e., parallel and collinear with light 1.

The object-side lens 170 is positioned relative to the object-side CR reflection boundary 130 such that light 1 from the object O incident on the cloaking assembly 10 on the left hand side (−X direction) propagates through and is focused by the object-side lens 170 (light 2) onto the outward facing mirror surface 132 as light 3. The centrally positioned exterior reflection boundary 135 is positioned relative to the object-side CR reflection boundary 130 such that light 3 from the object-side lens 170 is reflected by the outward facing mirror surface 132 onto the inward facing mirror surface 137 (light 4). In embodiments, light 4 is focused to a focal line $f_2$ and the inward facing mirror surface 137 is positioned at the focal line $f_2$. That is, light 1 incident on the object-side lens 170 along the height h (Z-direction) of the outward facing convex surface 174 may be generally focused by the object-side lens 170, and reflected by the outward facing mirror surface 132, to the focal line $f_2$ extending in the Z-direction.

The centrally positioned exterior reflection boundary 135 may be positioned relative to CR reflection boundaries 130, 140 such that light 4 from the outward facing mirror surface 132 is reflected by and diverges from the inward facing mirror surface 137 onto the outward facing mirror surface 142 of the image-side CR reflection boundary 140 (light 5). The image-side CR reflection boundary 140 is positioned relative to the centrally positioned exterior reflection boundary 135 such that light 5 from the inward facing mirror surface 137 is reflected by the outward facing mirror surface 142 onto the inward facing surface 182 of the image-side lens 180 (light 6). The image-side lens 180 is positioned relative to the image-side CR reflection boundary 140 such that light 6 from the outward facing mirror surface 142 propagates through and is focused by the image-side lens 180 (light 7) in a direction generally parallel to the apex axis 16 (light 8) and forms a portion of the Image I on the left hand side (−X direction) of the apex axis 16. In embodiments, the image-side lens 180 focuses the light 7 back to its original path, i.e., parallel and collinear with light 1.

Although FIG. 1 depicts the second ends 158, 178 of the object-side lenses 150, 170, respectively, and the second ends 168, 188 of the image-side lenses 160, 180, respectively, positioned in contact with each other, it should be understood that the second ends 158, 178 and/or second ends 168, 188 may be spaced apart from each other along the X-axis such that an uncloaked region or gap (not shown) is present between the spaced apart second ends 158, 178 and/or spaced apart second ends 168, 188. In such embodiments, an image of the portion of the object O positioned above (+Y direction) the uncloaked region is not provided on the image side 14 of the cloaking assembly 10.

Still referring to FIG. 1, light 1 from the object 'O' travels in the −Y direction and is incident on the outward facing convex surfaces 154, 174 of the object-side lenses 150, 170, respectively. Light 1 on the right hand side (+X-direction) of the apex axis 16 of the cloaking assembly 10 is focused as light 2 by the object-side lens 150 onto the outward facing mirror surface 112 (light 3) of the object-side CR reflection boundary 110 before being reflected to the focal line $f_1$ as light 4 onto the inward facing mirror surface 117. Light 4 is reflected by and diverges from the inward facing mirror surface 117 as light 5 onto the outward facing mirror surface 122 of the image-side CR reflection boundary 120 before being reflected onto the inward facing surface 162 of the image-side lens 160 as light 6. Light 6 propagates through and is focused by the image-side lens 160 (light 7) generally parallel to light 1 in the −Y-direction (light 8) and forms a portion of the image I corresponding to the portion of the object O positioned to the right (+X-direction) of the apex axis 16. Accordingly, light 1 from the object O on the right hand side of the apex axis 16 has an optical path of: Object O—object-side lens 150—outward facing mirror surface 112—inward facing mirror surface 117—outward facing mirror surface 122—image-side lens 160—I.

Light 1 on the left hand side (−X-direction) of the apex axis 16 of the cloaking assembly 10 is focused as light 2 by the object-side lens 170 to the outward facing mirror surface 132 (light 3) of the object-side CR reflection boundary 130 before being reflected to the focal line $f_2$ as light 4 on the inward facing mirror surface 137. Light 4 is reflected by and diverges from the inward facing mirror surface 137 as light 5 to the outward facing mirror surface 142 of the image-side CR reflection boundary 140 before being reflected onto the inward facing surface 182 of the image-side lens 180 as light 6. Light 6 propagates through and is focused by the image-side lens 180 (light 7) generally parallel to light 1 in the −Y-direction (light 8) and forms a portion of the image I corresponding to the portion of the object O positioned to the left (−X-direction) of the apex axis 16. Accordingly, light 1 from the object O on the left hand side of the apex axis 16 has an optical path of: Object O—object-side lens 170— outward facing mirror surface 132—inward facing mirror surface 137—outward facing mirror surface 142—image-side lens 180—I.

In combination, i.e., light 1 on the right hand side (+X direction) and left hand side (−X direction) of the apex axis 16 from the object O on the object-side 12 of the cloaking assembly 10 propagates to the image-side 14 via the optical path: Object O—object-side lenses 150, 170—outward facing mirror surfaces 112, 132—inward facing mirror surfaces 117, 137—outward facing mirror surfaces 122, 142—image-side lenses 160, 180—Image. That is, light 1 from the object O propagates via the optical path: object O—outward facing convex surfaces 154, 174 of the object-side lenses 150, 170, respectively—inward facing surfaces 152, 172 of the object-side lenses 150, 170, respectively—outward facing mirror surfaces 112, 132 of the object-side CR reflection boundaries 110, 130, respectively—inward facing mirror surfaces 117, 137 of the centrally positioned exterior reflection boundaries 115, 135, respectively—outward facing mirror surfaces 122, 142 of the image-side CR reflection boundaries 120, 140, respectively—inward facing surfaces 162, 182 of the image-side lenses 160, 180, respectively—outward facing convex surfaces 164, 184 of the image-side lenses 160, 180, respectively—image I.

Figure 3:
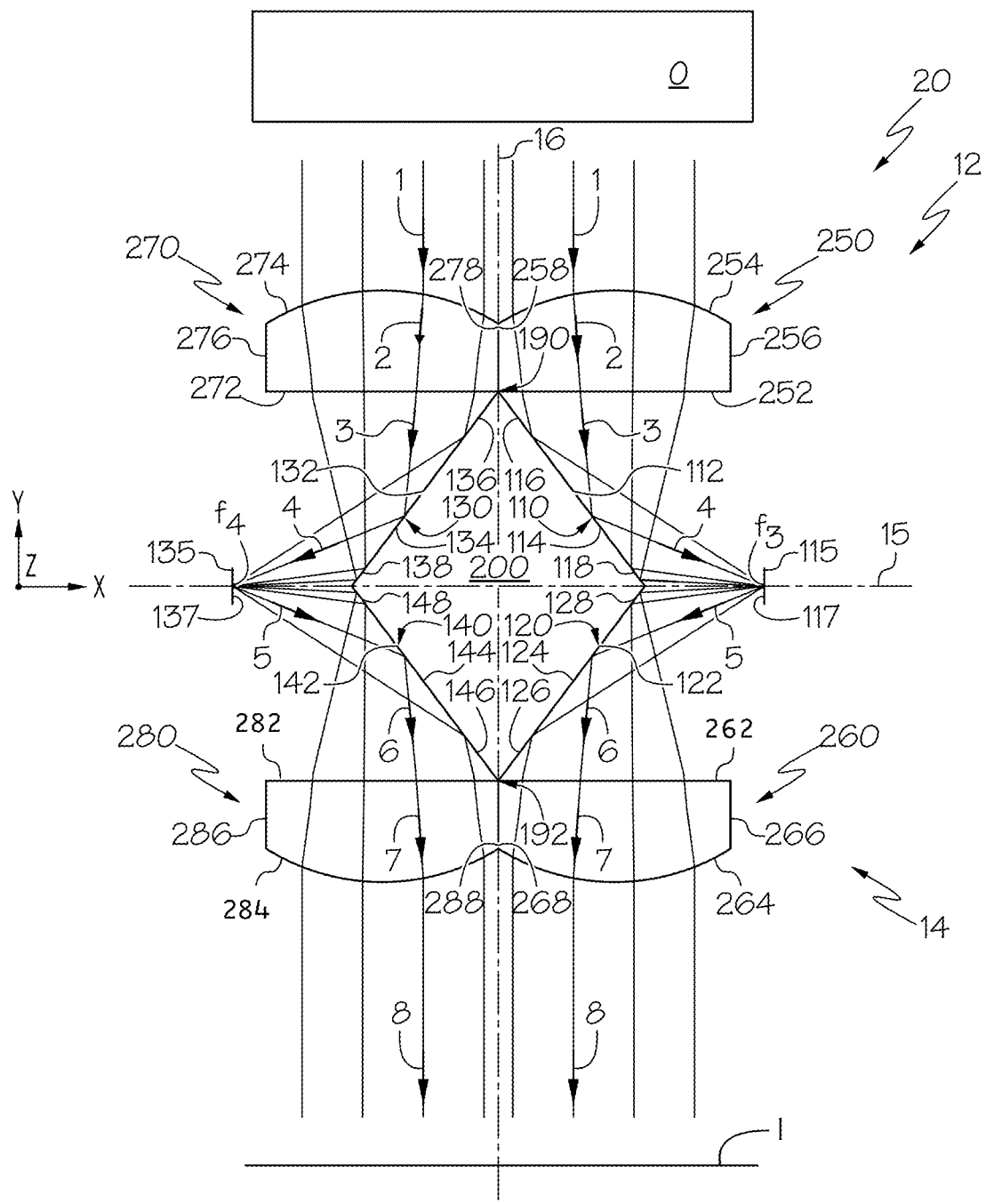
FIG. 3 schematically depicts a top view of a cloaking device according to one or more embodiments disclosed and described herein.

While FIG. 1 depicts the cloaking assembly 10 comprising achromatic lenses, it should be understood that the lenses 150, 160, 170, 180 may not be achromatic lenses. For example, FIG. 3 depicts a cloaking assembly 20 with cylindrical lenses rather than achromatic lenses. Particularly, the lenses 150, 160, 170, 180 depicted in FIG. 1 are in the form of cylindrical lenses 250, 260, 270, 280, respectively (also referred to herein as "lenses 250, 260, 270, 280"). Similar to the lenses 150, 160, 170, 180 depicted in the cloaking assembly 10, each of the lenses 250, 260, 270, 280 has a length along the X-axis, a thickness along the Y-axis and a height along the Z-axis of the coordinate axes shown in the figures. That is, the X-axis shown in the figures extends along a length of the lenses 250, 260, 270, 280, the Y-axis shown in the figures extends along a thickness of the lenses 250, 260, 270, 280, and the Z-axis shown in the figures extends along a height of the lenses 250, 260, 270, 280. The two lenses 250, 270 may be positioned on the object-side 12 of the cloaking assembly 20 to face an object 'O' and may be referred to herein as object-side lenses 250, 270. The two lenses 260, 280 may be positioned on the image-side 14 of the cloaking assembly 20 to provide an image 'I' formed by the cloaking assembly 20 and may be referred to herein as image-side lenses 260, 280.

The lenses 250, 260, 270, 280 each have an inward facing surface 252, 262, 272, 282 and an outward facing convex surface 254, 264, 274, 284, respectively. In embodiments, the inward facing surfaces 252, 262, 272, 282 are planar surfaces. In other embodiments, the inward facing surfaces 252, 262, 272, 282 are not planar surfaces, i.e., the inward facing surfaces 252, 262, 272, 282 are curved surfaces. The lenses 250, 260, 270, 280 each have a first end 256, 266, 276, 286 distal to the apex axis 16 and a second end 258, 268, 278, 288, respectively, proximal to the apex axis 16. The inward facing surfaces 252, 262, 272, 282 and outward facing convex surfaces 254, 264, 274, 284 extend between the first ends 256, 266, 276 286 and the second ends 258, 268, 278, 288, respectively.

Figure 4:
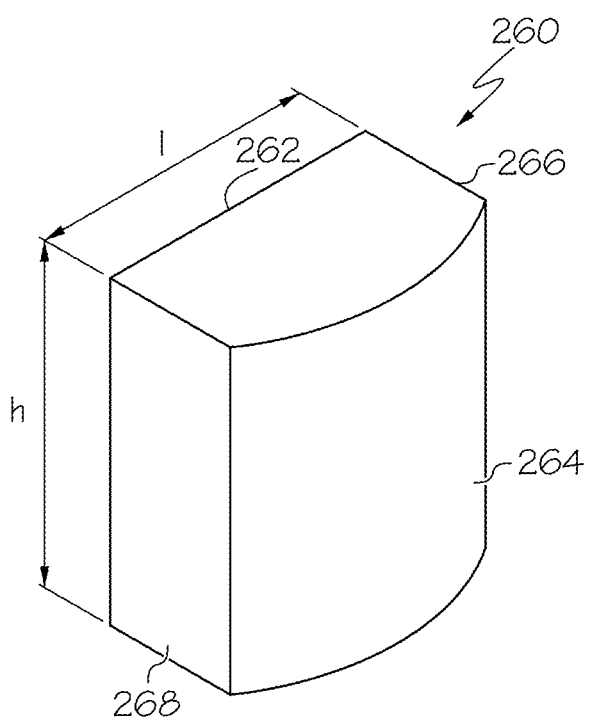
FIG. 4 schematically depicts a cylindrical lens for a cloaking device according to one or more embodiments disclosed and described herein.

An isolated perspective view of the lens 260 is depicted in FIG. 4. The lens 260 includes the inward facing surface 262 and the outward facing convex surface 264. The outward facing convex surface 264 has a radius 'r2'. The inward facing surface 262 and the outward facing cylindrical surface 264 extend between the first end 266 and the second end 268. The lens 260 has a length 'l' along the X-direction, a thickness (not labeled) in the Y-direction, and a height 'h' extending in the Z-direction.

The object-side lens 250 is positioned relative to the object-side CR reflection boundary 110 such that light 1 from the object O incident on the cloaking assembly 20 on the right hand side (+X direction) propagates through and is focused by the object-side lens 250 (light 2) onto the outward facing mirror surface 112 (light 3). The centrally positioned exterior reflection boundary 115 is positioned relative to the object-side CR reflection boundary 110 such that light 3 from the object-side lens 250 is reflected by the outward facing mirror surface 112 onto the inward facing mirror surface 117 (light 4). In embodiments, light 4 is focused to a focal line $f_3$ and the inward facing mirror surface 117 is positioned at the focal line $f_3$. That is, light 1 incident on the object-side lens 250 along the height h (Z-direction) of the outward facing convex surface 254 may be generally focused by the object-side lens 250, and reflected by the outward facing mirror surface 112, to the focal line $f_3$ extending in the Z-direction.

The centrally positioned exterior reflection boundary 115 may be positioned relative to CR reflection boundaries 110, 120 such that light 4 from the outward facing mirror surface 112 is reflected by and diverges from the inward facing mirror surface 117 onto the outward facing mirror surface 122 of the image-side CR reflection boundary 120 (light 5). The image-side CR reflection boundary 120 is positioned relative to the centrally positioned exterior reflection boundary 115 such that light 5 from the inward facing mirror surface 117 is reflected onto the inward facing surface 262 of the image-side lens 260 (light 6). The image-side lens 260 is positioned relative to the image-side CR reflection boundary 120 such that light 6 from the outward facing mirror surface 122 propagates through and is focused by the image-side lens 260 (light 7) in a direction generally parallel to the apex axis 16 (light 8) and forms a portion of the Image I on the right hand side (+X direction) of the apex axis 16.

In embodiments, the image-side lens 260 focuses the light 7 back to its original path, i.e., parallel and collinear with light 1.

The object-side lens 270 is positioned relative to the object-side CR reflection boundary 130 such that light 1 from the object O incident on the cloaking assembly 20 on the left hand side (−X direction) propagates through and is focused by the object-side lens 270 (light 2) onto the outward facing mirror surface 132 as light 3. The centrally positioned exterior reflection boundary 135 is positioned relative to the object-side CR reflection boundary 130 such that light 3 from the object-side lens 270 is reflected by the outward facing mirror surface 132 onto the inward facing mirror surface 137 (light 4). In embodiments, light 4 is focused to a focal line $f_4$ and the inward facing mirror surface 137 is positioned at the focal line $f_4$. That is, light 1 incident on the object-side lens 270 along the height h (Z-direction) of the outward facing convex surface 274 may be generally focused by the object-side lens 270, and reflected by the outward facing mirror surface 132, to the focal line $f_4$ extending in the Z-direction.

The centrally positioned exterior reflection boundary 135 may be positioned relative to CR reflection boundaries 130, 140 such that light 4 from the outward facing mirror surface 132 is reflected by and diverges from the inward facing mirror surface 137 onto the outward facing mirror surface 142 of the image-side CR reflection boundary 140 (light 5). The image-side CR reflection boundary 140 is positioned relative to the centrally positioned exterior reflection boundary 135 such that light 5 from the inward facing mirror surface 137 is reflected by the outward facing mirror surface 142 onto the inward facing surface 282 of the image-side lens 280 (light 6). The image-side lens 280 is positioned relative to the image-side CR reflection boundary 140 such that light 6 from the outward facing mirror surface 142 propagates through and is focused by the image-side lens 280 (light 7) in a direction generally parallel to the apex axis 16 (light 8) and forms a portion of the Image I on the left hand side (−X direction) of the apex axis 16. In embodiments, the image-side lens 280 focuses the light 7 back to its original path, i.e., parallel and collinear with light 1.

Although FIG. 3 depicts the second ends 258, 278 of the object-side lenses 250, 270, respectively, and the second ends 268, 288 of the image-side lenses 260, 280, respectively, positioned in contact with each other, it should be understood that the second ends 258, 278 and/or second ends 268, 288 may be spaced apart from each other along the X-axis such that an uncloaked region or gap (not shown) is present between the spaced apart second ends 258, 278 and/or spaced apart second ends 268, 288. In such embodiments, an image of the portion of the object O positioned above (+Y direction) the uncloaked region is not provided on the image side 14 of the cloaking assembly 20.

Still referring to FIG. 3, light 1 from the object 'O' travels in the −Y direction and is incident on the outward facing convex surfaces 254, 274 of the lenses 250, 270, respectively. Light 1 on the right hand side (+X-direction) of the apex axis 16 of the cloaking assembly 20 is focused as light 2 by the object-side lens 250 onto the outward facing mirror surface 112 (light 3) of the object-side CR reflection boundary 110 before being reflected to the focal line $f_3$ as light 4 on the inward facing mirror surface 117. Light 4 is reflected by and diverges from the inward facing mirror surface 117 as light 5 onto the outward facing mirror surface 122 of the image-side CR reflection boundary 120 before being reflected onto the inward facing surface 262 of the image-side lens 260 as light 6. Light 6 propagates through and is focused by the image-side lens 260 (light 7) generally parallel to light 1 in the −Y-direction (light 8) and forms a portion of the image I corresponding to the portion of the object O positioned to the right (+X-direction) of the apex axis 16. Accordingly, light 1 from the object O on the right hand side of the apex axis 16 has an optical path of: Object O—object-side lens 250—outward facing mirror surface 112—inward facing mirror surface 117—outward facing mirror surface 122—image-side lens 260—I.

Light 1 on the left hand side (−X-direction) of the apex axis 16 of the cloaking assembly 20 is focused as light 2 by the object-side lens 270 onto the outward facing mirror surface 132 (light 3) of the object-side CR reflection boundary 130 before being reflected to the focal line $f_4$ as light 4 on the inward facing mirror surface 137. Light 4 is reflected by and diverges from the inward facing mirror surface 137 as light 5 onto the outward facing mirror surface 142 of the image-side CR reflection boundary 140 before being reflected onto the inward facing surface 282 of the image-side lens 280 as light 6. Light 6 propagates through and is focused by the image-side lens 280 (light 7) generally parallel to light 1 in the −Y-direction (light 8) and forms a portion of the image I corresponding to the portion of the object O positioned to the left (−X-direction) of the apex axis 16. Accordingly, light 1 from the object O on the left hand side of the apex axis 16 has an optical path of: Object O—object-side lens 270—outward facing mirror surface 132—inward facing mirror surface 137—outward facing mirror surface 142—image-side lens 280—I.

In combination, i.e., light 1 on the right hand side (+X direction) and left hand side (−X direction) of the apex axis 16 from the object O on the object-side 12 of the cloaking assembly 20 propagates to the image-side 14 via the optical path: Object O—object-side lenses 250, 270—outward facing mirror surfaces 112, 132—inward facing mirror surfaces 117, 137—outward facing mirror surfaces 122, 142—image-side lenses 260, 280—Image. That is, light 1 from the object O propagates via the optical path: object O—outward facing convex surfaces 254, 274 of the object-side lenses 250, 270, respectively—inward facing surfaces 252, 272 of the object-side lenses 250, 270, respectively—outward facing mirror surfaces 112, 132 of the object-side CR reflection boundaries 110, 130, respectively—inward facing mirror surfaces 117, 137 of the centrally positioned exterior reflection boundaries 115, 135, respectively—outward facing mirror surfaces 122, 142 of the image-side CR reflection boundaries 120, 140, respectively—inward facing surfaces 262, 282 of the image-side lenses 260, 280, respectively—outward facing convex surfaces 264, 284 of the image-side lenses 260, 280, respectively—image I.

Figure 5:
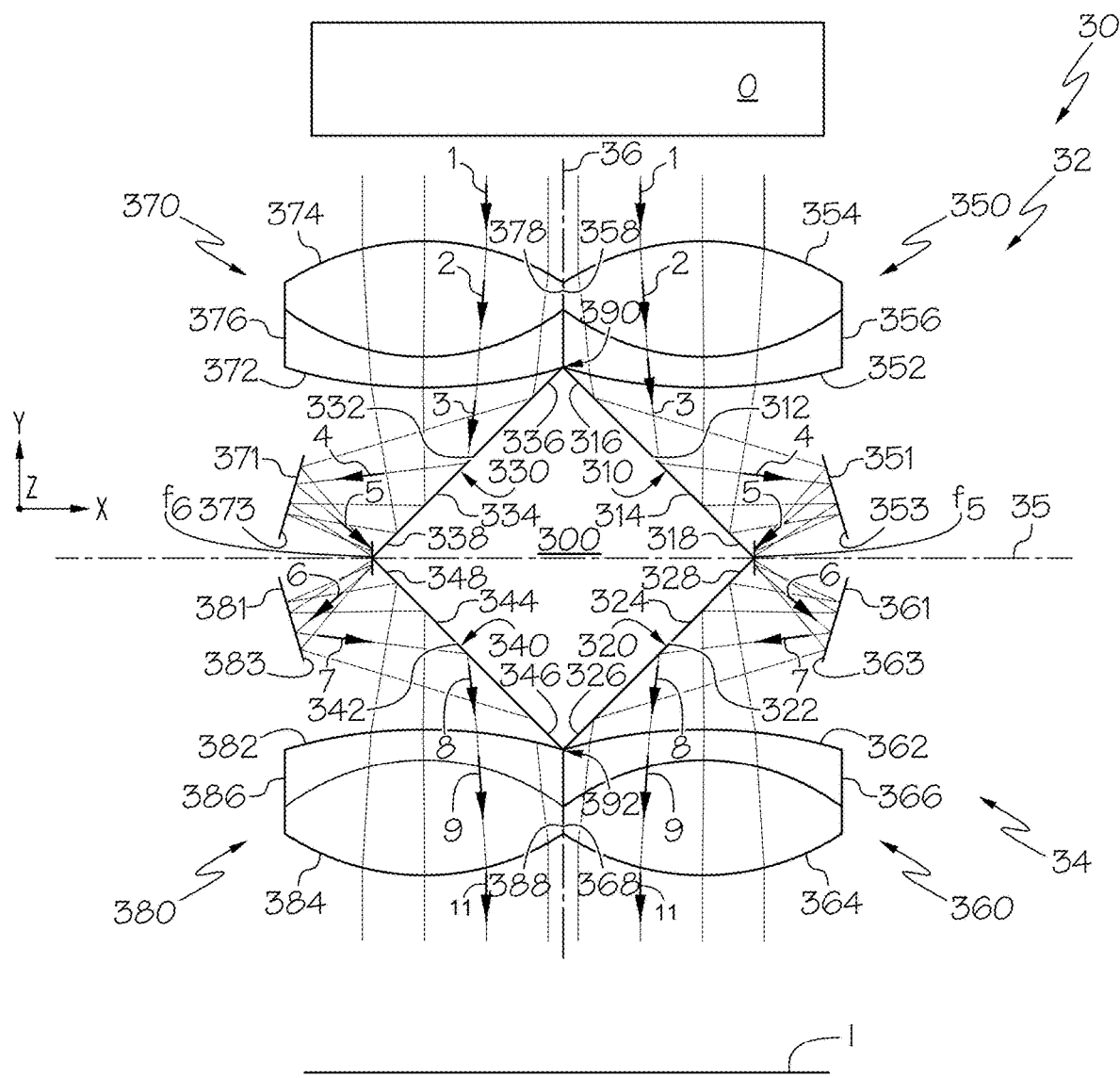
FIG. 5 schematically depicts a top view of a cloaking device according to one or more embodiments disclosed and described herein.

Referring now to FIG. 5, embodiments of a cloaking assembly similar to cloaking assembly 10, except for the centrally positioned exterior reflection boundaries 115, 135, are depicted. That is, a cloaking assembly 30 wherein the at least one exterior reflection boundary comprises an object-side exterior reflection boundary with an inward facing mirror surface, a centrally positioned reflection boundary with an outward facing mirror surface, and an image-side exterior reflection boundary with an inward facing mirror surface is depicted in FIG. 5. The cloaking assembly 30 includes an object-side 32, an image-side 34 and four CR reflection boundaries 310, 320, 330, 340. The object side 32 is positioned above (+Y direction) a bisecting axis 35 and the image-side 34 is positioned below (−Y direction) the bisecting axis 35. That is, the bisecting axis 35 extends between and delineates the object-side 32 and the image-side 34. Each of the four CR reflection boundaries 310, 320, 330, 340 has a length along the X-axis, a width along the Y-axis and a height along the Z-axis shown in the figures. That is, the X-axis shown in the figures extends along a length of the four CR reflection boundaries 310, 320, 330, 340, the Y-axis shown in the figures extends along a width of the four CR reflection boundaries 310, 320, 330, 340, and the Z-axis shown in the figures extends along a height of the four CR reflection boundaries 310, 320, 330, 340. The two CR reflection boundaries 310, 330 may be positioned on the object-side 32 of the cloaking assembly 30 to face an object 'O' and may be referred to herein as object-side CR reflection boundaries 310, 330. The two CR reflection boundaries 320, 340 may be positioned on the image-side 34 of the cloaking assembly 30 to provide an image 'I' formed by the cloaking assembly 30 and may be referred to herein as image-side CR reflection boundaries 320, 340.

The CR reflection boundaries 310, 320, 330, 340 each have an outward facing mirror surface 312, 322, 332, 342 and an inward facing surface 314, 324, 334, 344, respectively. In embodiments, one or more of the inward facing surfaces 314, 324, 334, 344 may be an opaque surface or a mirror surface. The outward facing mirror surfaces 312, 322, 332, 342 can be made from omnidirectional photonic crystals or mirrors such that light incident on the outward facing mirror surfaces 312, 322, 332, 342 is reflected there from.

The CR reflection boundaries 310, 320, 330, 340 may have an apex end 316, 326, 336, 346 and a side end 318, 328, 338, 348, respectively. The side ends 318, 328, 338, 348 are spaced apart from the apex ends 316, 326, 336, 346, respectively, and the CR reflection boundaries 310, 320, 330, 340 extend between apex ends 316, 326, 336, 346 and side ends 318, 328, 338, 348, respectively. In embodiments, the apex ends 316, 336 of the two object-side CR reflection boundaries 310, 330, respectively, meet or intersect at an apex 390, and in the alternative or in addition to, the apex ends 326, 346 of the two image-side CR reflection boundaries 320, 340, respectively, meet or intersect at an apex 392. In such embodiments, an apex axis 36 bisects the apex 390 and the apex 392, and may be a centerline between a right hand side (+X direction) and a left hand side (−X direction) of the cloaking assembly 30. In other embodiments, the apex ends 316, 336 of the two object-side CR reflection boundaries 310, 330, respectively, are spaced apart from each other and/or the apex ends 326, 346 of the two image-side CR reflection boundaries 320, 340, respectively, are spaced apart from each other such that a uncloaked region or gap (not shown) is present between the spaced apart apex ends 316, 336 and/or spaced apart apex ends 326, 346. In such embodiments, an image of the portion of the object O positioned above (+Y direction) the uncloaked region is not provided on the image side 34 of the cloaking assembly 30.

In embodiments, the side end 318 may be positioned adjacent to and may be joined to side end 328 and the side end 338 may be positioned adjacent to and may be joined to side end 348 as depicted in FIG. 5. In other embodiments, the side ends 318, 338 may be spaced apart (Y direction) from the side ends 328, 348 (not shown).

In embodiments, the two object-side CR reflection boundaries 310, 330 and the two image-side CR reflection boundaries 320, 340 form a cloaking region 300 that is bound at least partly by the inward facing surfaces 314, 334, 324, 344. The two object-side CR reflection boundaries 310, 330 and the two image-side CR reflection boundaries 320, 340 have a height 'h' (FIG. 8) in the Z-direction of the coordinate axes in the figures and light reflected or transmitted within the cloaking region 300 does not pass through the inward facing surfaces 314, 334, 324, 344. Accordingly, an article located within the cloaking region 300 (e.g., a cloaked article) is not visible to an observer viewing the cloaking assembly 30 from the image-side 34 in the +Y direction.

Still referring to FIG. 5, the cloaking assembly may include four lenses 350, 360, 370, 380. Each of the four lenses 350, 360, 370, 380 has a length along the X-axis, a thickness along the Y-axis and a height along the Z-axis of the coordinate axes shown in the figures. That is, the X-axis shown in the figures extends along a length of the four lenses 350, 360, 370, 380, the Y-axis shown in the figures extends along a thickness of the four lenses 350, 360, 370, 380, and the Z-axis shown in the figures extends along a height of the four lenses 350, 360, 370, 380. The two lenses 350, 370 may be positioned on the object-side 32 of the cloaking assembly 30 to face an object 'O' and may be referred to herein as object-side lenses 350, 370. The two lenses 360, 380 may be positioned on the image-side 34 of the cloaking assembly 30 to provide an image 'I' formed by the cloaking assembly 30 and may be referred to herein as image-side lenses 360, 380.

The lenses 350, 360, 370, 380 each have an inward facing surface 352, 362, 372, 382 and an outward facing convex surface 354, 364, 374, 384, respectively. In embodiments, the inward facing surfaces 352, 362, 372, 382 are planar surfaces. In other embodiments, the inward facing surfaces 352, 362, 372, 382 are not planar surfaces, i.e., the inward facing surfaces 352, 362, 372, 382 are curved surfaces. The lenses 350, 360, 370, 380 each have a first end 356, 366, 376, 386, respectively, distal to the apex axis 36 and a second end 358, 368, 378, 388, respectively, proximal to the apex axis 36. The inward facing surfaces 352, 362, 372, 382 and outward facing convex surfaces 354, 364, 374, 384 extend between the first ends 356, 366, 376 386 and the second ends 358, 368, 378, 388, respectively. In embodiments, the lenses 350, 360, 370, 380 may be achromatic lenses as depicted in FIGS. 2 and 5.

The cloaking assembly 30 may include a pair of object-side exterior reflection boundaries 351, 371, a pair of centrally positioned reflection boundaries 355, 375 (labeled in FIG. 6 for clarity), and a pair of image-side exterior reflection boundaries 361, 381. The object-side exterior reflection boundaries 351, 371 are spaced apart from and positioned proximate to CR reflection boundaries 310, 330, respectively. The object-side exterior reflection boundary 351 is positioned outwardly (+X direction) from the object-side CR reflection boundary 310 and has an inward facing mirror surface 353 facing the outward facing mirror surface 312. The object-side exterior reflection boundary 371 is positioned outwardly (−X direction) from the object-side CR reflection boundary 330 and has an inward facing mirror surface 373 facing the outward facing mirror surface 332. The image-side exterior reflection boundaries 361, 381 are spaced apart from and positioned proximate to CR reflection boundaries 320, 340, respectively. The image-side exterior reflection boundary 361 is positioned outwardly (+X direction) from the image-side CR reflection boundary 320 and has an inward facing mirror surface 363 facing the outward facing mirror surface 322. The image-side exterior reflection boundary 381 is positioned outwardly (−X direction) from the image-side CR reflection boundary 340 and has an inward facing mirror surface 383 facing the outward facing mirror surface 342.

The centrally positioned reflection boundary 355 may be positioned between the object-side exterior reflection boundary 351 and the image-side exterior reflection boundary 361. The centrally positioned reflection boundary 355 includes an outward facing mirror surface 357 (FIG. 6) facing the inward facing mirror surface 353 of the object-side exterior reflection boundary 351 and the inward facing mirror surface 363 of the image-side exterior reflection boundary 361. Similarly, the centrally positioned reflection boundary 375 may be positioned between the object-side exterior reflection boundary 371 and the image-side exterior reflection boundary 381. The centrally positioned reflection boundary 375 includes an outward facing mirror surface 377 (FIG. 6) facing the inward facing mirror surface 373 of the object-side exterior reflection boundary 371 and the inward facing mirror surface 383 of the image-side exterior reflection boundary 381.

The object-side lens 350 is positioned relative to the object-side CR reflection boundary 310 such that light 1 from the object O incident on the cloaking assembly 30 on the right hand side (+X direction) propagates through and is focused by the object-side lens 350 (light 2) onto the outward facing mirror surface 312 (light 3). The object-side exterior reflection boundary 351 is positioned relative to the object-side CR reflection boundary 310 such that light 3 from the object-side lens 350 is reflected by the outward facing mirror surface 312 onto the inward facing mirror surface 353 (light 4). The centrally positioned reflection boundary 355 is positioned relative to the object-side exterior reflection boundary 351 such that light 4 is reflected by the inward facing mirror surface 353 onto the outward facing mirror surface 357 (light 5). In embodiments, light 5 is focused to a focal line $f_5$ and the outward facing mirror surface 357 is positioned at the focal line $f_5$. That is, light 1 incident on the object-side lens 350 along the height h (Z-direction) of the outward facing convex surface 354 may be generally focused by the object-side lens 350, and reflected by the outward facing mirror surface 312 and the inward facing mirror surface 353, to the focal line $f_5$ extending in the Z-direction.

The image-side exterior reflection boundary 361 is positioned relative to the centrally positioned reflection boundary 355 such that light 5 is reflected by and diverges from the outward facing mirror surface 357 onto the inward facing mirror surface 363 (light 6). The image-side CR reflection boundary 320 is positioned relative to the image-side exterior reflection boundary 361 such that light 6 is reflected by the inward facing mirror surface 363 onto the outward facing mirror surface 322 (light 7). The image-side lens 360 is positioned relative to the image-side CR reflection boundary 320 such that light 7 reflected from the outward facing mirror surface 322 (light 8) propagates through and is focused by the image-side lens 360 (light 9) in a direction generally parallel to the apex axis 36 (light 11) and forms a portion of the Image I on the right hand side (+X direction) of the apex axis 36. In embodiments, the image-side lens 360 focuses the light 9 back to its original path, i.e., parallel and collinear with light 1.

The object-side lens 370 is positioned relative to the object-side CR reflection boundary 330 such that light 1 from the object O incident on the cloaking assembly 30 on the left hand side (−X direction) propagates through and is focused by the object-side lens 370 (light 2) onto the outward facing mirror surface 332 (light 3). The object-side exterior reflection boundary 371 is positioned relative to the object-side CR reflection boundary 330 such that light 3 from the object-side lens 370 is reflected by the outward facing mirror surface 332 onto the inward facing mirror surface 373 (light 4). The centrally positioned reflection boundary 375 is positioned relative to the object-side exterior reflection boundary 371 such that light 4 is reflected by the inward facing mirror surface 373 onto the outward facing mirror surface 377 (light 5). In embodiments, light 5 is focused to a focal line $f_6$ and the outward facing mirror surface 377 is positioned at the focal line $f_6$. That is, light 1 incident on the object-side lens 370 along the height h (Z-direction) of the outward facing convex surface 374 may be generally focused by the object-side lens 370, and reflected by the outward facing mirror surface 332 and the inward facing mirror surface 373, to the focal line $f_6$ extending in the Z-direction.

The image-side exterior reflection boundary 381 is positioned relative to the centrally positioned reflection boundary 375 such that light 5 is reflected by and diverges from the outward facing mirror surface 377 onto the inward facing mirror surface 383 (light 6). The image-side CR reflection boundary 340 is positioned relative to the image-side exterior reflection boundary 381 such that light 6 is reflected by the inward facing mirror surface 383 onto the outward facing mirror surface 342 (light 7). The image-side lens 380 is positioned relative to the image-side CR reflection boundary 340 such that light 7 reflected from the outward facing mirror surface 342 (light 8) propagates through and is focused by the image-side lens 380 (light 9) in a direction generally parallel to the apex axis 36 (light 11) and forms a portion of the Image I on the left hand side (−X direction) of the apex axis 36. In embodiments, the image-side lens 380 focuses the light 9 back to its original path, i.e., parallel and collinear with light 1.

Although FIG. 5 depicts the second ends 358, 378 of the object-side lenses 350, 370, respectively, and the second ends 368, 388 of the image-side lenses 360, 380, respectively, positioned in contact with each other, it should be understood that the second ends 358, 378 and/or second ends 368, 388 may be spaced apart from each other along the X-axis such that an uncloaked region or gap (not shown) is present between the spaced apart second ends 358, 378 and/or spaced apart second ends 368, 388. In such embodiments, an image of the portion of the object O positioned above (+Y direction) the uncloaked region is not provided on the image side 34 of the cloaking assembly 30.

Still referring to FIG. 5, light 1 from the object 'O' travels in the −Y direction and is incident on the outward facing convex surfaces 354, 374 of the object-side lenses 350, 370, respectively. Light 1 on the right hand side (+X-direction) of the apex axis 36 of the cloaking assembly 30 is focused as light 2 by the object-side lens 350 onto the outward facing mirror surface 312 (light 3) of the object-side CR reflection boundary 310. Light 3 is reflected by the outward facing mirror surface 312 as light 4 onto the inward facing mirror surface 353 of the object-side exterior reflection boundary 351, and the inward facing mirror surface 353 reflects light 4 to the focal line $f_5$ on the outward facing mirror surface 357 (light 5) of the centrally positioned reflection boundary 355. Light 5 is reflected by and diverges from the outward facing mirror surface 357 as light 6 onto the inward facing mirror surface 363 of the image-side exterior reflection boundary 361. Light 6 is reflected by the inward facing mirror surface 363 of the image-side exterior reflection boundary 361 as light 7 onto the outward facing mirror surface 322 of the image-side CR reflection boundary 320. Light 7 is reflected by the outward facing mirror surface 322 as light 8 onto the inward facing surface 362 of the image-side lens 360. Light 8 is focused by the image-side lens 360 as light 9. Light 9 propagates from the image-side lens 360 generally parallel to light 1 as light 11 in the −Y-direction and forms a portion of the image I corresponding to the portion of the object O positioned to the right (+X-direction) of the apex axis 36. Accordingly, light 1 from the object O on the right hand side of the apex axis 36 has an optical path of: Object O—object-side lens 350—outward facing mirror surface 312—inward facing mirror surface 353—outward facing mirror surface 357—inward facing mirror surface 363—outward facing mirror surface 322—image-side lens 360—I.

Light 1 on the left hand side (−X-direction) of the apex axis 36 of the cloaking assembly 30 is focused as light 2 by the object-side lens 370 onto the outward facing mirror surface 332 (light 3) of the object-side CR reflection boundary 330. Light 3 is reflected by the outward facing mirror surface 332 as light 4 onto the inward facing mirror surface 373 of the object-side exterior reflection boundary 371, and the inward facing mirror surface 373 reflects light 4 to the focal line $f_6$ on the outward facing mirror surface 377 (light 5) of the centrally positioned reflection boundary 375. Light 5 is reflected by and diverges from the outward facing mirror surface 377 as light 6 to the inward facing mirror surface 383 of the image-side exterior reflection boundary 381. Light 6 is reflected by the inward facing mirror surface 383 of the image-side exterior reflection boundary 381 as light 7 onto the outward facing mirror surface 342 of the image-side CR reflection boundary 340. Light 7 is reflected by the outward facing mirror surface 342 as light 8 onto the inward facing surface 382 of the image-side lens 380. Light 8 is focused by the image-side lens 380 as light 9. Light 9 propagates from the image-side lens 380 generally parallel to light 1 as light 11 in the −Y-direction and forms a portion of the image I corresponding to the portion of the object O positioned to the left (−X-direction) of the apex axis 36. Accordingly, light 1 from the object O on the left hand side of the apex axis 36 has an optical path of: Object O—object-side lens 370—outward facing mirror surface 332—inward facing mirror surface 373—outward facing mirror surface 377—inward facing mirror surface 383—outward facing mirror surface 342—image-side lens 380—I.

In combination, i.e., light 1 on the right hand side (+X direction) and left hand side (−X direction) of the apex axis 36 from the object O on the object-side 32 of the cloaking assembly 30 propagates to the image-side 34 via the optical path: Object O—object-side lenses 350, 370—outward facing mirror surfaces 312, 332—inward facing mirror surfaces 353, 373—outward facing mirror surfaces 357, 377—inward facing mirror surfaces 363, 383—outward facing mirror surfaces 322, 342—image-side lenses 360, 380—Image. That is, light 1 from the object O propagates via the optical path: object O—outward facing convex surfaces 354, 374 of the object-side lenses 350, 370, respectively—inward facing surfaces 352, 372 of the object-side lenses 350, 370, respectively—outward facing mirror surfaces 312, 332 of the object-side CR reflection boundaries 310, 330, respectively—inward facing mirror surfaces 353, 373 of the object-side exterior reflection boundaries 351, 371, respectively—outward facing mirror surfaces 357, 377 of the centrally positioned reflection boundaries 355, 375, respectively—inward facing mirror surfaces 363, 383 of the image-side exterior reflection boundaries 361, 381, respectively—outward facing mirror surfaces 322, 342 of the image-side CR reflection boundaries 320, 340, respectively—inward facing surfaces 362, 382 of the image-side lenses 360, 380, respectively—outward facing convex surfaces 364, 384 of the image-side lenses 360, 380, respectively—image I.

Figure 6:
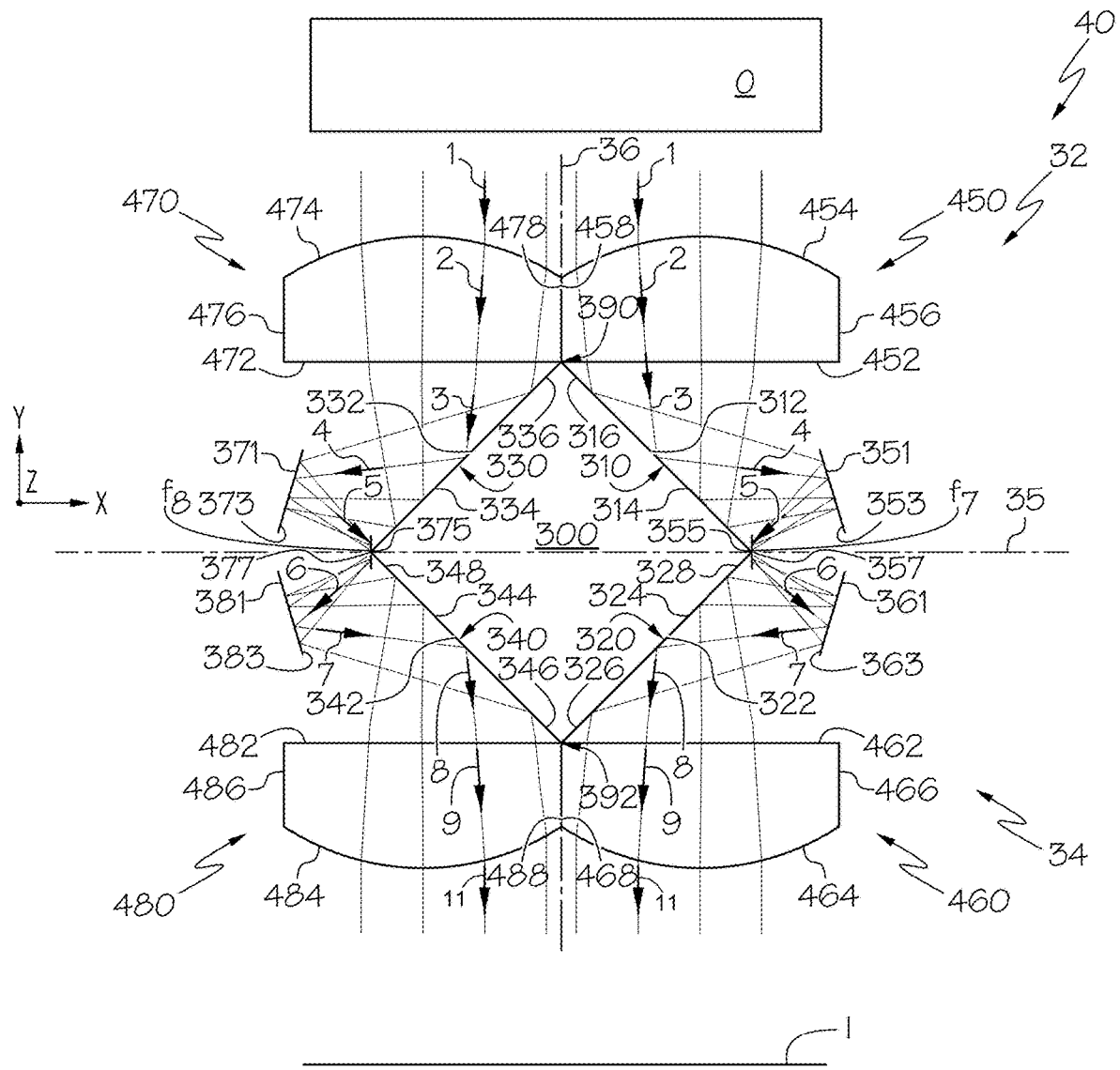
FIG. 6 schematically depicts a top view of a cloaking device according to one or more embodiments disclosed and described herein.

While FIG. 5 depicts the cloaking assembly 30 comprising achromatic lenses, it should be understood that the lenses 350, 360, 370, 380 may not be achromatic lenses. For example, FIG. 6 depicts a cloaking assembly 40 with cylindrical lenses rather than achromatic lenses. Particularly, the lenses 350, 360, 370, 380 depicted in FIG. 5 are in the form of cylindrical lenses 450, 460, 470, 480, respectively (also referred to herein as "lenses 450, 460, 470, 480"). Similar to the lenses 350, 360, 370, 380 depicted in the cloaking assembly 30, each of the lenses 450, 460, 470, 480 has a length along the X-axis, a thickness along the Y-axis and a height along the Z-axis of the coordinate axes shown in the figures. That is, the X-axis shown in the figures extends along a length of the lenses 450, 460, 470, 480, the Y-axis shown in the figures extends along a thickness of the lenses 450, 460, 470, 480, and the Z-axis shown in the figures extends along a height of the lenses 450, 460, 470, 480. The two lenses 450, 470 may be positioned on the object-side 32 of the cloaking assembly 40 to face an object 'O' and may be referred to herein as object-side lenses 450, 470. The two lenses 460, 480 may be positioned on the image-side 34 of the cloaking assembly 40 to provide an image 'I' formed by the cloaking assembly 40 and may be referred to herein as image-side lenses 460, 480.

The lenses 450, 460, 470, 480 each have an inward facing surface 452, 462, 472, 482 and an outward facing convex surface 454, 464, 474, 484, respectively. In embodiments, the inward facing surfaces 452, 462, 472, 482 are planar surfaces. In other embodiments, the inward facing surfaces 452, 462, 472, 482 are not planar surfaces, i.e., the inward facing surfaces 452, 462, 472, 482 are curved surfaces. The lenses 450, 460, 470, 480 each have a first end 456, 466, 476, 486 distal to the apex axis 36 and a second end 458, 468, 478, 488, respectively, proximal to the apex axis 36. The inward facing surfaces 452, 462, 472, 482 and outward facing convex surfaces 454, 464, 474, 484 extend between the first ends 456, 466, 476 486 and the second ends 458, 468, 478, 488, respectively.

Still referring to FIG. 6, the object-side lens 450 is positioned relative to the object-side CR reflection boundary 310 such that light 1 from the object O incident on the cloaking assembly 40 on the right hand side (+X direction) propagates through and is focused by the object-side lens 450 (light 2) onto the outward facing mirror surface 312 (light 3). The object-side exterior reflection boundary 351 is positioned relative to the object-side CR reflection boundary 310 such that light 3 from the object-side lens 450 is reflected by the outward facing mirror surface 312 onto the inward facing mirror surface 353 (light 4). The centrally positioned reflection boundary 355 is positioned relative to the object-side exterior reflection boundary 351 such that light 4 is reflected by the inward facing mirror surface 353 onto the outward facing mirror surface 357 (light 5). In embodiments, light 5 is focused to a focal line $f_7$ and the outward facing mirror surface 357 is positioned at the focal line $f_7$. That is, light 1 incident on the object-side lens 450 along the height h (Z-direction) of the outward facing convex surface 454 may be generally focused by the object-side lens 450, and reflected by the outward facing mirror surface 312 and the inward facing mirror surface 353, to the focal line $f_7$ extending in the Z-direction.

The image-side exterior reflection boundary 361 is positioned relative to the centrally positioned reflection boundary 355 such that light 5 is reflected by and diverges from the outward facing mirror surface 357 onto the inward facing mirror surface 363 (light 6). The image-side CR reflection boundary 320 is positioned relative to the image-side exterior reflection boundary 361 such that light 6 is reflected by the inward facing mirror surface 363 onto the outward facing mirror surface 322 (light 7). The image-side lens 460 is positioned relative to the image-side CR reflection boundary 320 such that light 7 reflected from the outward facing mirror surface 322 (light 8) propagates through and is focused by the image-side lens 460 (light 9) in a direction generally parallel to the apex axis 36 (light 11) and forms a portion of the Image I on the right hand side (+X direction) of the apex axis 36. In embodiments, the image-side lens 460 focuses the light 9 back to its original path, i.e., parallel and collinear with light 1.

The object-side lens 470 is positioned relative to the object-side CR reflection boundary 330 such that light 1 from the object O incident on the cloaking assembly 40 on the left hand side (−X direction) propagates through and is focused by the object-side lens 470 (light 2) onto the outward facing mirror surface 332 (light 3). The object-side exterior reflection boundary 371 is positioned relative to the object-side CR reflection boundary 330 such that light 3 from the object-side lens 470 is reflected by the outward facing mirror surface 332 onto the inward facing mirror surface 373 (light 4). The centrally positioned reflection boundary 375 is positioned relative to the object-side exterior reflection boundary 371 such that light 4 is reflected by the inward facing mirror surface 373 onto the outward facing mirror surface 377 (light 5). In embodiments, light 5 is focused to a focal line $f_8$ and the outward facing mirror surface 377 is positioned at the focal line $f_8$. That is, light 1 incident on the object-side lens 470 along the height h (Z-direction) of the outward facing convex surface 474 may be generally focused by the object-side lens 470, and reflected by the outward facing mirror surface 332 and the inward facing mirror surface 373, to the focal line $f_8$ extending in the Z-direction.

The image-side exterior reflection boundary 381 is positioned relative to the centrally positioned reflection boundary 375 such that light 5 is reflected by and diverges from the outward facing mirror surface 377 onto the inward facing mirror surface 383 (light 6). The image-side CR reflection boundary 340 is positioned relative to the image-side exterior reflection boundary 381 such that light 6 is reflected by the inward facing mirror surface 383 onto the outward facing mirror surface 342 (light 7). The image-side lens 480 is positioned relative to the image-side CR reflection boundary 340 such that light 7 reflected from the outward facing mirror surface 342 (light 8) propagates through and is focused by the image-side lens 480 (light 9) in a direction generally parallel to the apex axis 36 (light 11) and forms a portion of the Image I on the left hand side (−X direction) of the apex axis 36. In embodiments, the image-side lens 480 focuses the light 9 back to its original path, i.e., parallel and collinear with light 1.

Although FIG. 6 depicts the second ends 458, 478 of the object-side lenses 450, 470, respectively, and the second ends 468, 488 of the image-side lenses 460, 480, respectively, positioned in contact with each other, it should be understood that the second ends 458, 478 and/or second ends 468, 488 may be spaced apart from each other along the X-axis such that an uncloaked region or gap (not shown) is present between the spaced apart second ends 458, 478 and/or spaced apart second ends 468, 488. In such embodiments, an image of the portion of the object O positioned above (+Y direction) the uncloaked region is not provided on the image side 34 of the cloaking assembly 40.

Light 1 from the object 'O' travels in the −Y direction and is incident on the outward facing convex surfaces 454, 474 of the object-side lenses 450, 470, respectively. Light 1 on the right hand side (+X-direction) of the apex axis 36 of the cloaking assembly 40 is focused as light 2 by the object-side lens 450 onto the outward facing mirror surface 312 (light 3) of the object-side CR reflection boundary 310. Light 3 is reflected by the outward facing mirror surface 312 as light 4 onto the inward facing mirror surface 353 of the object-side exterior reflection boundary 351, and the inward facing mirror surface 353 reflects light 4 to the focal line $f_7$ on the outward facing mirror surface 357 (light 5) of the centrally positioned reflection boundary 355. Light 5 is reflected by and diverges from the outward facing mirror surface 357 as light 6 onto the inward facing mirror surface 363 of the image-side exterior reflection boundary 361. Light 6 is reflected by the inward facing mirror surface 363 of the image-side exterior reflection boundary 361 as light 7 onto the outward facing mirror surface 322 of the image-side CR reflection boundary 320. Light 7 is reflected by the outward facing mirror surface 322 as light 8 onto the inward facing surface 462 of the image-side lens 460. Light 8 is focused by the image-side lens 460 as light 9. Light 9 propagates from the image-side lens 460 generally parallel to light 1 as light 11 in the −Y-direction and forms a portion of the image I corresponding to the portion of the object O positioned to the right (+X-direction) of the apex axis 36. Accordingly, light 1 from the object O on the right hand side of the apex axis 36 has an optical path of: Object O—object-side lens 450—outward facing mirror surface 312—inward facing mirror surface 353—outward facing mirror surface 357—inward facing mirror surface 363—outward facing mirror surface 322—image-side lens 460—I.

Light 1 on the left hand side (−X-direction) of the apex axis 36 of the cloaking assembly 40 is focused as light 2 by the object-side lens 470 onto the outward facing mirror surface 332 (light 3) of the object-side CR reflection boundary 330. Light 3 is reflected by the outward facing mirror surface 332 as light 4 onto the inward facing mirror surface 373 of the object-side exterior reflection boundary 371, and the inward facing mirror surface 373 reflects light 4 to the focal line $f_8$ on the outward facing mirror surface 377 (light 5) of the centrally positioned reflection boundary 375. Light 5 is reflected by and diverges from the outward facing mirror surface 377 as light 6 onto the inward facing mirror surface 383 of the image-side exterior reflection boundary 381. Light 6 is reflected by the inward facing mirror surface 383 of the image-side exterior reflection boundary 381 as light 7 onto the outward facing mirror surface 342 of the image-side CR reflection boundary 340. Light 7 is reflected by the outward facing mirror surface 342 as light 8 onto the inward facing surface 482 of the image-side lens 480. Light 8 is focused by the image-side lens 480 as light 9. Light 9 propagates from the image-side lens 480 generally parallel to light 1 as light 11 in the −Y-direction and forms a portion of the image I corresponding to the portion of the object O positioned to the left (−X-direction) of the apex axis 36. Accordingly, light 1 from the object O on the left hand side of the apex axis 36 has an optical path of: Object O—object-side lens 470—outward facing mirror surface 332—inward facing mirror surface 373—outward facing mirror surface 377—inward facing mirror surface 383—outward facing mirror surface 342—image-side lens 480—I.

In combination, i.e., light 1 on the right hand side (+X direction) and left hand side (−X direction) of the apex axis 36 from the object O on the object-side 32 of the cloaking assembly 40 propagates to the image-side 34 via the optical path: Object O—object-side lenses 450, 470—outward facing mirror surfaces 312, 332—inward facing mirror surfaces 353, 373—outward facing mirror surfaces 357, 377—inward facing mirror surfaces 363, 383—outward facing mirror surfaces 322, 342—image-side lenses 460, 480—Image. That is, light 1 from the object O propagates via the optical path: object O—outward facing convex surfaces 454, 474 of the object-side lenses 450, 470, respectively—inward facing surfaces 452, 472 of the object-side lenses 450, 470, respectively—outward facing mirror surfaces 312, 332 of the object-side CR reflection boundaries 310, 330, respectively—inward facing mirror surfaces 353, 373 of the object-side exterior reflection boundaries 351, 371, respectively—outward facing mirror surfaces 357, 377 of the centrally positioned reflection boundaries 355, 375, respectively—inward facing mirror surfaces 363, 383 of the image-side exterior reflection boundaries 361, 381, respectively—outward facing mirror surfaces 322, 342 of the image-side CR reflection boundaries 320, 340, respectively—inward facing surfaces 462, 482 of the image-side lenses 460, 480, respectively—outward facing convex surfaces 464, 484 of the image-side lenses 460, 480, respectively—image I.

Figure 7:
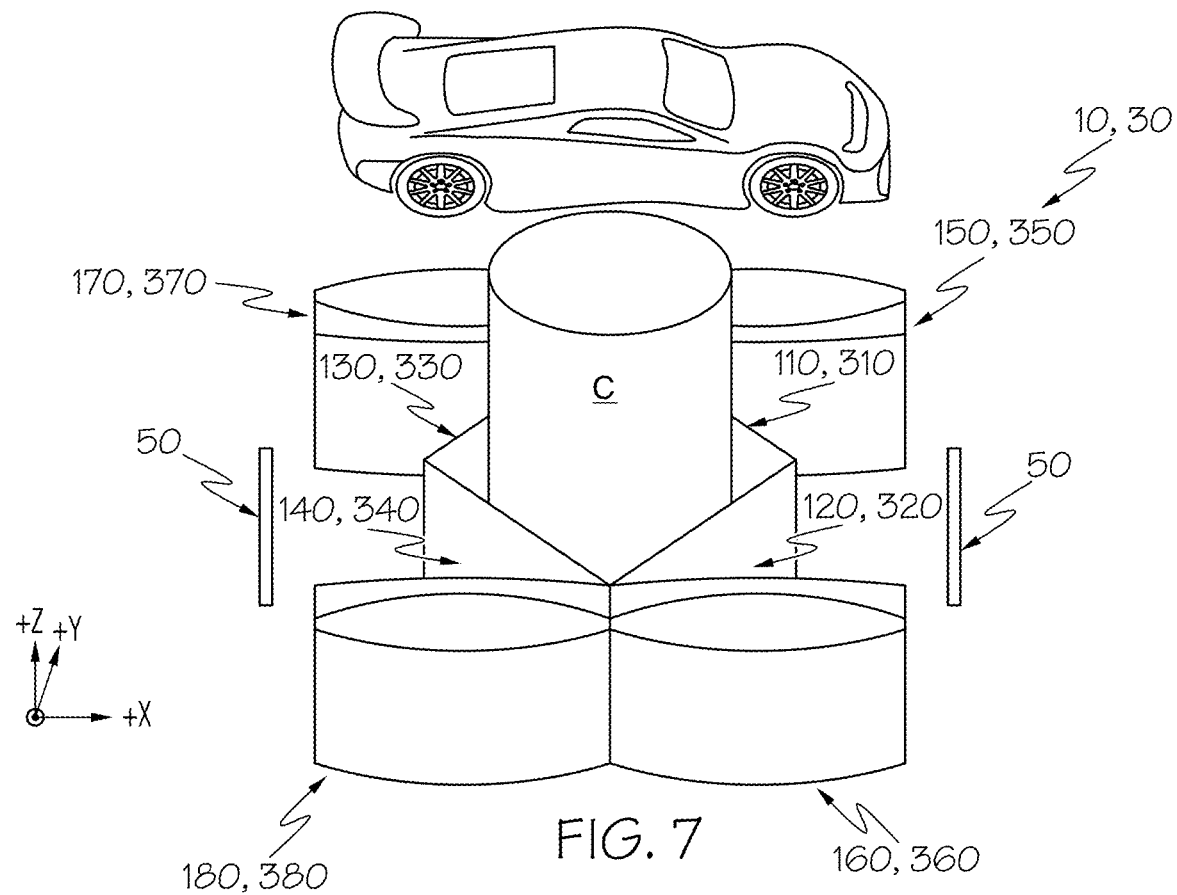
FIG. 7 schematically depicts a top perspective view of the cloaking devices of FIGS. 1 and 5 with a first object on one side of the cloaking devices and a second object within the cloaking regions of the cloaking devices according to one or more embodiments disclosed and described herein.
Figure 8:
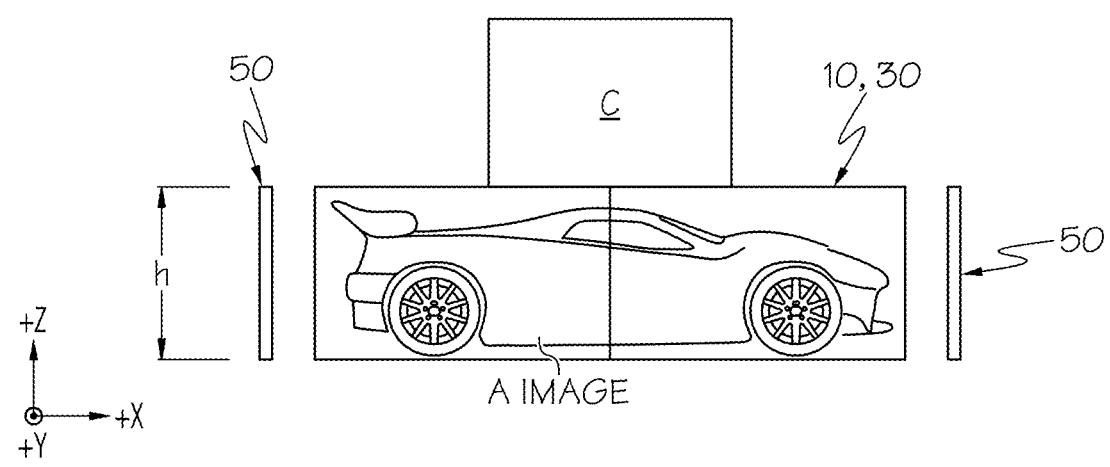
FIG. 8 schematically depicts a side view of the cloaking devices of FIGS. 1 and 5 with a first object on one side of the cloaking devices and a second object within the cloaking regions of the cloaking devices according to one or more embodiments disclosed and described herein.

Referring now to FIGS. 1, 5, and 7-8, a top perspective view and a side view of cloaking devices according to embodiments as discussed with respect to FIGS. 1 and 5 is shown in FIGS. 7 and 8, respectively. Specifically, FIG. 7 is a top perspective view of an article in the form of a column 'C' within the cloaking region of the cloaking assemblies 10, 30 and an automobile 'A' located behind the column C on the object-side 12, 32 of the cloaking assemblies 10, 30 in the +Y direction. The column C has a height dimension in the Z direction (increasing height in the +Z direction) greater than the height h of the cloaking device. FIG. 8 is a side view from the +Y direction of the cloaking assemblies 10, 30 shown in FIGS. 1 and 5. Box 50 represents the centrally positioned exterior reflection boundaries 115, 135 of cloaking assembly 10, and the object-side exterior reflection boundaries 351, 371, centrally positioned reflection boundaries 355, 375 and image-side exterior reflection boundaries 361, 381 of cloaking assembly 30. FIG. 8 also shows the portion of the column C that is within the cloaking region is not visible and the automobile A located behind the column C in the +Y direction is visible to an observer viewing the cloaking assemblies 10, 30 in the +Y direction. Accordingly, the column C positioned within the cloaking region is not visible to an observer viewing the image-side 14, 34 of the cloaking assemblies 10, 30 and an image of the entire automobile A is visible to the observer viewing the image-side 14, 34. Although column C in FIGS. 7 and 8 is separate from the CR reflection boundaries 110-140, 310-340, i.e., column C is a separate object from the cloaking assemblies 10, 30, it should be appreciated that column C may be structurally part of cloaking assemblies 10, 30 and have an outer surface that provides or is equivalent to the CR reflection boundaries with outward facing mirror surfaces.

Figure 9:
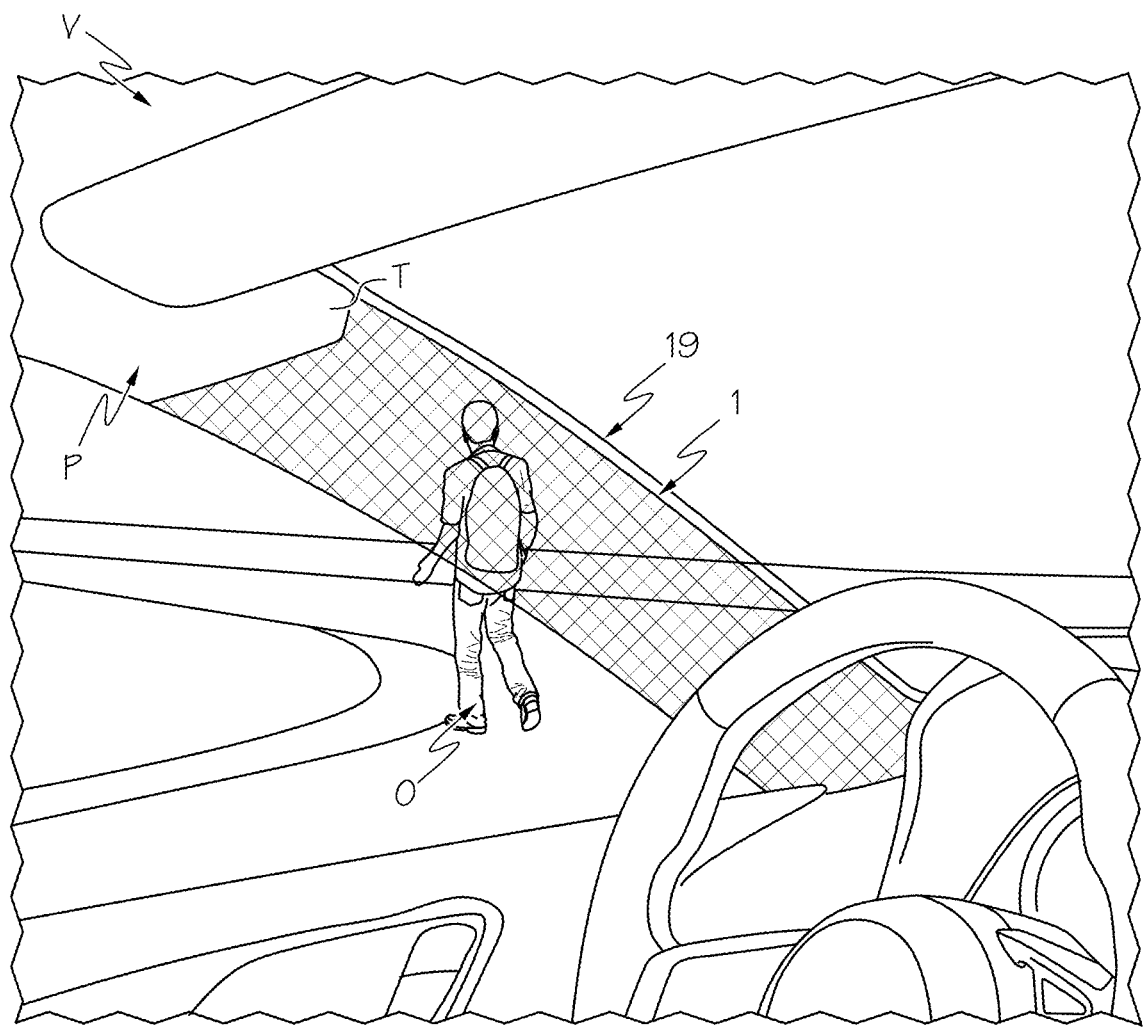
FIG. 9 schematically depicts a cloaking device cloaking a vehicle A-pillar of a vehicle according to one or more embodiments described and illustrated herein.

Referring to FIG. 9, embodiments of an A-pillar of a vehicle being cloaked by a cloaking device are shown. Particularly, FIG. 9 shows a cloaking device 19 according to one or more embodiments disclosed herein cloaking a portion of an A-pillar P of a vehicle V. A portion of the A-pillar P is positioned within a cloaking region (not shown) of the cloaking device 19 and a portion of the A-pillar P extends beyond the cloaking device and is covered with trim T. Illustrated outside of the vehicle V on the object-side of the cloaking device 19 is a target object 'O' in the form of pedestrian. A portion of the pedestrian O is visible through a side window of the vehicle V and a portion of the pedestrian is visible "through" the A-pillar P cloaked by the cloaking device 19. The cloaking device 19 redirects light reflected from the pedestrian O around the A-pillar P positioned within the cloaking region of the cloaking device 19 and forms an image I of the pedestrian O in the interior of the vehicle on the image-side of the cloaking device 19 that is visible to an occupant of the vehicle V looking towards the pedestrian O. Accordingly, light from the pedestrian O appears to pass through the A-pillar P and a blind spot typically created by the A-pillar P is not as present as when the portion of the A-pillar P is not positioned within the cloaking region of the cloaking device 19. In embodiments, the A-pillar P itself serves as the CR, i.e. the A-pillar P has an outer surface with one or more outer facing mirror surfaces that assist in redirecting light from the pedestrian O around the A-pillar P. It should be appreciated that cloaking of the A-pillar P with the cloaking device 19 and bypassing the blind spot produced by the A-pillar P is performed without the use of metamaterials, video images, cameras, sophisticated electronics, etc.

EXAMPLES

Figure 10A:
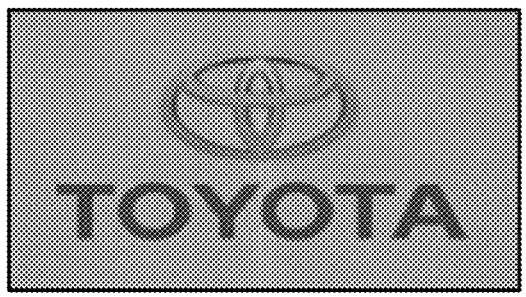
FIG. 10A depicts a computer simulated cloaking image for a cloaking device according to the embodiments of FIG. 1 with a 0° misalignment between an apex axis and a viewing angle the cloaking device.
Figure 10B:
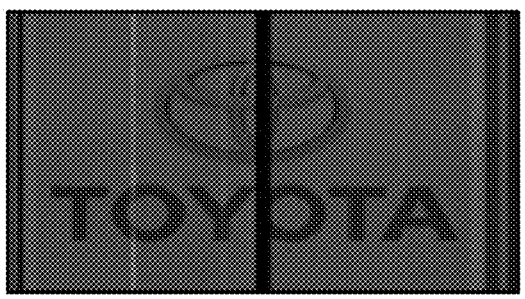
FIG. 10B depicts a computer simulated cloaking image for a cloaking device according to the embodiments of FIG. 1 with a 1° misalignment between an apex axis and a viewing angle the cloaking device.
Figure 10C:
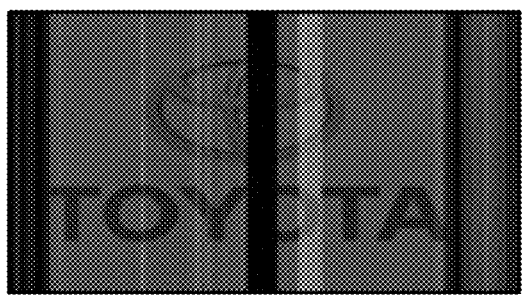
FIG. 10C depicts a computer simulated cloaking image for a cloaking device according to the embodiments of FIG. 1 with a 2° misalignment between an apex axis and a viewing angle the cloaking device.
Figure 10D:
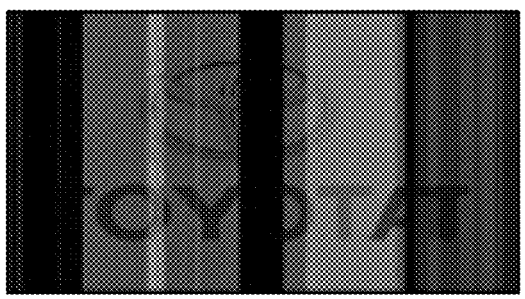
FIG. 10D depicts a computer simulated cloaking image for a cloaking device according to the embodiments of FIG. 1 with a 3° misalignment between an apex axis and a viewing angle the cloaking device.

Referring now to FIGS. 10A-10D, images of an object in the form of an emblem positioned on the object-side 12 of the cloaking assembly 10 and as viewed from the image-side 14 simulated using a commercial software program (Zemax OpticStudio) are depicted. The lenses 150, 160, 170, 180 were commercially available achromatic doublet lenses (AC254-030, Thorlabs). The aspect ratios for the entire device area and the hidden region were 0.91 and 0.77, respectively, with a cloaking ratio (i.e., hidden area/total device area) of about 18%. FIG. 10A depicts an image of the object with no misalignment (0°) between the apex axis 16 and a viewing angle of the cloaking assembly 10 from the +Y direction, i.e., an individual viewing the image I in the +Y direction along the apex axis 16. That is, as used herein, the term misalignment refers to an angle defined by the apex axis of a cloaking assembly and a line of sight of an observer viewing the cloaking assembly from the image-side as depicted by the +Y direction in the figures (also referred to herein as a "viewing angle"). FIG. 10B depicts an image of the object with a 1° misalignment between the apex axis 16 and a viewing angle of the cloaking assembly 10. FIG. 10C depicts an image of the object with a 2° misalignment between the apex axis 16 and a viewing angle of the cloaking assembly 10. FIG. 10D depicts an image of the object with a 3° misalignment between the apex axis 16 and a viewing angle of the cloaking assembly 10. As shown by the images in FIGS. 10A-10D, an image of an object on the object-side 12 of the cloaking assembly 10 can be seen clearly with up to 2° misalignment and is still visible with up to 3° of misalignment.

The cloaking devices described herein may be used to cloak vehicle articles when viewed from within the vehicle, such as a vehicle A-pillar, B-pillar, C-pillar, D-pillar, etc., and bypass a blind spot caused by the vehicle article. Also, the cloaking devices described herein may be used to cloak other items or particles such as cables, extension cords, hoses and the like. The terms "object," "article," and "item" may interchangeably refer to a visual object or image (2D or 3D) that reflects light or transmits light and the term "light from" may refer to "light reflected from" or "light transmitted from." The terms "generally," "approximately," and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Although the embodiments disclosed and described in the figures depict a cloaking assembly with four achromatic or cylindrical lenses and a CR bounded by four CR reflection boundaries, cloaking assemblies with two achromatic or cylindrical lenses and a CR bounded by two CR reflection boundaries are provided. For example and without limitation, a cloaking assembly may include only one object-side lens and one image-side lens, and the cloaking region bounded between an object-side CR reflection boundary and an image-side CR reflection boundary.

Directional terms as used herein—for example up, down, right, left, front, back, top, bottom, vertical, horizontal—are made only with reference to the figures as drawn and are not intended to imply absolute orientation unless otherwise expressly stated.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A cloaking device comprising:
   an object-side, an image-side and an apex axis extending from the object-side to the image-side;
   an object-side CR reflection boundary having an outward facing mirror surface and an inward facing surface and an image-side CR reflection boundary having an outward facing mirror surface and an inward facing surface;
   a cloaking region bounded by the inward facing surfaces of the object-side CR reflection boundary and the image-side CR reflection boundary;
   an object-side lens and an image-side lens, the object-side lens and the image-side lens each comprising an outward facing convex surface;
   at least one exterior reflection boundary comprising an inward facing mirror surface spaced apart from the object-side CR reflection boundary and the image-side CR reflection boundary;
   wherein light from an object positioned on the object-side of the cloaking device and obscured by the cloaking region is focused by the object-side lens, reflected by the object-side CR reflection boundary, the at least one exterior reflection boundary and the image-side CR reflection boundary, and focused by the image-side lens to form an image of the object on the image-side of the cloaking device such that the light from the object appears to pass through the cloaking region.

2. The cloaking device of claim 1, wherein the at least one exterior reflection boundary comprises a centrally positioned exterior reflection boundary with the inward facing mirror surface facing the object-side CR reflection boundary and the image-side CR reflection boundary.

3. The cloaking device of claim 2, wherein the object-side lens is oriented to focus incident light from the object positioned on the object side of the cloaking device onto the object-side CR reflection boundary, the object-side CR reflection boundary is oriented to reflect light focused from the object-side lens onto the inward facing mirror surface of the centrally positioned exterior reflection boundary, the inward facing mirror surface of the centrally positioned exterior reflection boundary is oriented to reflect light from the object-side CR reflection boundary onto the image-side CR reflection boundary, the image-side CR reflection boundary is oriented to reflect light from the inward facing mirror surface of the centrally positioned exterior reflection boundary onto the image-side lens, and the image-side lens is oriented to focus light from the image-side CR reflection boundary and form the image of the object on the image-side of the cloaking device.

4. The cloaking device of claim 2, wherein the object-side lens focuses incident light from the object positioned on the object-side to a focal line and the inward facing mirror surface of the centrally positioned exterior reflection boundary is positioned at the focal line.

5. The cloaking device of claim 2, wherein the inward facing mirror surface of the centrally positioned exterior reflection boundary is oriented parallel to the apex axis.

6. The cloaking device of claim 1, wherein the at least one exterior reflection boundary comprises an object-side exterior reflection boundary with an inward facing mirror surface, a centrally positioned reflection boundary with an outward facing mirror surface, and an image-side exterior reflection boundary with an inward facing mirror surface.

7. The cloaking device of claim 6, wherein:
   the inward facing mirror surface of the object-side exterior reflection boundary faces the outward facing mirror surface of the object-side CR reflection boundary and the outward facing mirror surface of the centrally positioned reflection boundary; and
   the inward facing mirror surface of the image-side exterior reflection boundary faces the outward facing mirror surface of the centrally positioned reflection boundary and the outward facing mirror surface of the image-side CR reflection boundary.

8. The cloaking device of claim 6, wherein the object-side lens is oriented to focus incident light from the object positioned on the object side of the cloaking device onto the object-side CR reflection boundary, the object-side CR reflection boundary is oriented to reflect light focused from the object-side lens onto the object-side exterior reflection boundary, the object-side exterior reflection boundary is oriented to reflect light from the object-side CR reflection boundary onto the centrally positioned reflection boundary, the centrally positioned reflection boundary is oriented to reflect light from the object-side exterior reflection boundary onto the image-side exterior reflection boundary, the image-side exterior reflection boundary is oriented to reflect light from the centrally positioned reflection boundary onto the image-side CR reflection boundary, the image-side CR reflection boundary is oriented to reflect light from the image-side exterior reflection boundary onto the image-side lens, and the image-side lens is oriented to focus light from the image-side CR reflection boundary and form the image of the object on the image-side of the cloaking device.

9. The cloaking device of claim 6, wherein the outward facing mirror surface of the centrally positioned reflection boundary is oriented parallel to the apex axis.

10. A cloaking device assembly comprising:
    an object-side, an image-side and an apex axis extending from the object-side to the image-side;
    a pair of object-side CR reflection boundaries comprising a first object-side CR reflection boundary positioned on a first side of the apex axis and a second object-side CR reflection boundary positioned on a second side of the apex axis opposite the first side, wherein each of the pair of object-side CR reflection boundaries comprises an outward facing mirror surface and an inward facing surface;
    a pair of image-side CR reflection boundaries comprising a first image-side CR reflection boundary positioned on the first side of the apex axis and a second image-side CR reflection boundary positioned on the second side of the apex axis, wherein each of the pair of image-side CR reflection boundaries comprises an outward facing mirror surface and an inward facing surface;

a cloaking region bounded by the inward facing surfaces of the pair of object-side CR reflection boundaries and the pair of image-side CR reflection boundaries;

a pair of object-side lenses comprising a first object-side lens positioned on the first side of the apex axis and a second object-side lens positioned on the second side of the apex axis, wherein each of the pair of object-side lenses comprises an outward facing convex surface;

a pair of image-side lenses comprising a first image-side lens positioned on the first side of the apex axis and a second image-side lens positioned on the second side of the apex axis, wherein each of the pair of image-side lenses comprises an outward facing convex surface;

at least one pair of exterior reflection boundaries comprising a first exterior reflection boundary positioned on the first side of the apex axis and a second exterior reflection boundary positioned on the second side of the apex axis, wherein the first exterior reflection boundary comprises an inward facing mirror surface spaced apart from and facing the first object-side CR reflection boundary and the first image-side CR reflection boundary, and the second exterior reflection boundary comprises an inward facing mirror surface spaced apart from and facing the second object-side CR reflection boundary and the second image-side CR reflection boundary;

wherein light from an object positioned on the object-side of the cloaking device assembly and obscured by the cloaking region is focused by the pair of object-side lenses, reflected by the pair of object-side CR reflection boundaries, the at least one pair of exterior reflection boundaries and the pair of image-side CR reflection boundaries, and focused by the pair of image-side lenses to form an image of the object on the image-side of the cloaking device assembly such that the light from the object appears to pass through the cloaking region.

11. The cloaking device assembly of claim 10, wherein the pair of object-side lenses and the pair of image-side lenses are achromatic lenses.

12. The cloaking device assembly of claim 10, wherein the at least one pair of exterior reflection boundaries comprises a pair of centrally positioned exterior reflection boundaries with a first centrally positioned exterior reflection boundary positioned on the first side of the apex axis and a second centrally positioned exterior reflection boundary positioned on the second side of the apex axis, wherein each of the pair of centrally positioned exterior reflection boundaries comprises the inward facing mirror surface oriented parallel to the apex axis.

13. The cloaking device assembly of claim 12, wherein the pair of object-side lenses are oriented to focus incident light from the object positioned on the object side of the cloaking device assembly onto the pair of object-side CR reflection boundaries, the pair of object-side CR reflection boundaries are oriented to reflect light focused from the pair of object-side lenses onto the inward facing mirror surfaces of the pair of centrally positioned exterior reflection boundaries, the inward facing mirror surfaces of the pair of centrally positioned exterior reflection boundaries are oriented to reflect light from the pair of object-side CR reflection boundaries onto the pair of image-side CR reflection boundaries, the pair of image-side CR reflection boundaries are oriented to reflect light from the inward facing mirror surfaces of the pair of centrally positioned exterior reflection boundaries onto the pair of image-side lenses, and the pair of image-side lenses are oriented to focus light from the pair of image-side CR reflection boundaries and form the image of the object on the image-side of the cloaking device assembly.

14. The cloaking device assembly of claim 10, wherein the at least one pair of exterior reflection boundaries comprises a pair of object-side exterior reflection boundaries with an inward facing mirror surface, a pair of centrally positioned reflection boundaries with an outward facing mirror surface, and a pair of image-side exterior reflection boundaries with an inward facing mirror surface.

15. The cloaking device assembly of claim 14, wherein:

the pair of object-side lenses are oriented to focus incident light from the object positioned on the object side of the cloaking device assembly onto the pair of object-side CR reflection boundaries;

the pair of object-side CR reflection boundaries are oriented to reflect light focused from the pair of object-side lenses onto the pair of object-side exterior reflection boundaries;

the pair of object-side exterior reflection boundaries are oriented to reflect light from the pair of object-side CR reflection boundaries onto the pair of centrally positioned reflection boundaries;

the pair of centrally positioned reflection boundaries are oriented to reflect light from the pair of object-side exterior reflection boundaries onto the pair of image-side exterior reflection boundaries;

the pair of image-side exterior reflection boundaries are oriented to reflect light from the pair of centrally positioned reflection boundaries onto the pair of image-side CR reflection boundaries;

the pair of image-side CR reflection boundaries are oriented to reflect light from the pair of image-side exterior reflection boundaries onto the pair of image-side lenses; and the pair of image-side lenses are oriented to focus light from the pair of image-side CR reflection boundaries and form the image of the object on the image-side of the cloaking device assembly.

16. A vehicle comprising:

an A-pillar;

a cloaking device comprising:

object-side, an image-side, and an apex axis extending from the object-side to the image-side;

an object-side CR reflection boundary comprising an outward facing mirror surface and an inward facing surface, and an image-side CR reflection boundary comprising an outward facing mirror surface and an inward facing surface;

a cloaking region bounded by the inward facing surfaces of the object-side CR reflection boundary and the image-side CR reflection boundary, wherein the A-pillar is positioned within the cloaking region;

an object-side achromatic lens and an image-side achromatic lens, the object-side achromatic lens and the image-side achromatic lens each comprising an outward facing convex surface;

at least one exterior reflection boundary comprising an inward facing mirror surface spaced apart from the object-side CR reflection boundary and the image-side CR reflection boundary;

wherein light from an object positioned on the object-side of the cloaking device and obscured by the cloaking region is focused by the object-side achromatic lens, reflected by the object-side CR reflection boundary, the at least one exterior reflection boundary and the image-side CR reflection boundary, and focused by the image-side achromatic lens to form an image of the object on the image-side of the cloaking device such that the light from the object appears to pass through the A-pillar.

17. The vehicle of claim 16, wherein the at least one exterior reflection boundary comprises a centrally positioned exterior reflection boundary with the inward facing mirror surface oriented parallel to the apex axis and facing the object-side CR reflection boundary and the image-side CR reflection boundary.

18. The vehicle of claim 17, wherein the object-side lens focuses incident light from the object positioned on the object-side to a focal line and the inward facing mirror surface of the centrally positioned exterior reflection boundary is positioned at the focal line.

19. The vehicle of claim 16, wherein the at least one exterior reflection boundary comprises an object-side exterior reflection boundary with an inward facing mirror surface, a centrally positioned reflection boundary with an outward facing mirror surface oriented parallel to the apex axis, and an image-side exterior reflection boundary with an inward facing mirror surface.

20. The vehicle of claim 16, wherein the object-side achromatic lens is oriented to focus incident light from the object positioned on the object side of the cloaking device onto the object-side CR reflection boundary, the object-side CR reflection boundary is oriented to reflect light focused from the object-side achromatic lens onto the at least one exterior reflection boundary, the at least one exterior reflection boundary is oriented to reflect light from the object-side CR reflection boundary onto the image-side CR reflection boundary, the image-side CR reflection boundary is oriented to reflect light from the at least one exterior reflection boundary onto the image-side achromatic lens, and the image-side achromatic lens is oriented to focus light from the image-side CR reflection boundary and form the image of the object on the image-side of the cloaking device.

* * * * *